(12) United States Patent
Zhou et al.

(10) Patent No.: US 12,009,550 B1
(45) Date of Patent: Jun. 11, 2024

(54) LOWER PLASTIC ASSEMBLY, END COVER ASSEMBLY, ENERGY-STORAGE APPARATUS, AND ELECTRONIC DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Feng Wang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

(*) Notice: Subject to any disclaimer, the term of this patent is extended or adjusted under 35 U.S.C. 154(b) by 0 days.

(21) Appl. No.: 18/389,031

(22) Filed: Nov. 13, 2023

(30) Foreign Application Priority Data

Feb. 9, 2023 (CN) .......................... 202310091040.0

(51) Int. Cl.
*H01M 50/578* (2021.01)
*H01M 50/15* (2021.01)
(Continued)

(52) U.S. Cl.
CPC ......... *H01M 50/578* (2021.01); *H01M 50/15* (2021.01); *H01M 50/16* (2021.01); *H01M 50/3425* (2021.01)

(58) Field of Classification Search
CPC .... H01M 50/578; H01M 50/15; H01M 50/16; H01M 50/3425
See application file for complete search history.

(56) References Cited

U.S. PATENT DOCUMENTS

2018/0269457 A1* 9/2018 Kawate ............ H01M 10/0525

FOREIGN PATENT DOCUMENTS

| CN | 207925531 U | 9/2018 |
|---|---|---|
| CN | 209071498 U | 7/2019 |

(Continued)

OTHER PUBLICATIONS

CNIPA, International Search Report and Written Opinion for International Application No. PCT/CN2023/075264, Sep. 8, 2023, 12 pages.

(Continued)

*Primary Examiner* — Matthew T Martin
*Assistant Examiner* — Bartholomew A Hornsby
(74) *Attorney, Agent, or Firm* — IP Spring

(57) ABSTRACT

A lower plastic assembly, an end cover assembly, an energy-storage apparatus, and an electronic device are provided in the disclosure. The lower plastic assembly includes a first lower plastic member. The first lower plastic member comprises a first-lower-plastic-member body. The first-lower-plastic-member body has a first top surface and a first bottom surface opposite the first top surface, and further comprises a first part, a second part, and a first deformation portion. The first deformation portion is located between the first part and the second part in a length direction of the first-lower-plastic-member body. A ratio of a depth h1 of the first deformation portion to a height h2 of the first part ranges from 0.05 to 0.42 in a thickness direction of the first-lower-plastic-member body. A ratio of the depth h1 of the first deformation portion to a height h3 of the second part ranges from 0.16 to 0.6.

18 Claims, 13 Drawing Sheets

(51) Int. Cl.
    *H01M 50/16*     (2021.01)
    *H01M 50/342*     (2021.01)

(56) References Cited

FOREIGN PATENT DOCUMENTS

| | | |
|---|---|---|
| CN | 212934728 U | 4/2021 |
| CN | 212934729 U | 4/2021 |
| CN | 214313345 U | 9/2021 |
| CN | 215008384 U | 12/2021 |
| CN | 216389542 U | 4/2022 |
| CN | 217134507 U | 8/2022 |
| CN | 115020923 A | 9/2022 |
| CN | 217589168 U | 10/2022 |
| CN | 217589179 U | 10/2022 |
| CN | 115528378 A | 12/2022 |
| CN | 218070015 U | 12/2022 |
| CN | 115579597 A | 1/2023 |
| WO | 2022007481 A1 | 1/2022 |
| WO | 2022217884 A1 | 10/2022 |

OTHER PUBLICATIONS

CNIPA, First Office Action for Chinese Patent Application No. 202310091040.0, Apr. 14, 2023, 28 pages.
CNIPA, Notice of Allowance for Chinese Patent Application No. 202310091040.0, Apr. 27, 2023, 8 pages.

\* cited by examiner

LOWER PLASTIC ASSEMBLY, END COVER ASSEMBLY, ENERGY-STORAGE APPARATUS, AND ELECTRONIC DEVICE

CROSS-REFERENCE TO RELATED APPLICATION(S)

This application claims priority under 35 U.S.C. § 119(a) to Chinese Patent Application No. 202310091040.0, filed Feb. 9, 2023, the entire disclosure of which is incorporated herein by reference.

TECHNICAL FIELD

The disclosure relates to the field of energy-storage technologies, and in particular, to a lower plastic assembly, an end cover assembly, an energy-storage apparatus, and an electronic device.

BACKGROUND

A secondary battery generally includes an electrode assembly, a metal housing for accommodating the electrode assembly, and an end cover assembly. The electrode assembly is provided with a tab at the top of the electrode assembly. The end cover assembly is provided with an electrode post, a lower plastic member, a liquid injection hole, an explosion-proof valve, etc. During assembly, the tab is first connected to the electrode post, then the electrode assembly is placed in the housing, and the end cover assembly is welded to and seals the housing, so that a semi-finished battery can be assembled, and then after a series of processes such as liquid injection, battery formation, and capacity testing, a secondary battery can be obtained.

SUMMARY

In a first aspect, a lower plastic assembly is provided in the disclosure. The lower plastic assembly is applicable to an energy-storage apparatus and includes a first lower plastic member. The first lower plastic member includes a first-lower-plastic-member body. The first-lower-plastic-member body has a first top surface and a first bottom surface opposite the first top surface, and further includes a first part, a second part, and a first deformation portion. The first deformation portion is located between the first part and the second part in a length direction of the first-lower-plastic-member body. A ratio of a depth $h1$ of the first deformation portion to a height $h2$ of the first part ranges from 0.05 to 0.42 in a thickness direction of the first-lower-plastic-member body. A ratio of the depth $h1$ of the first deformation portion to a height $h3$ of the second part ranges from 0.16 to 0.6.

In a possible implementation, in the thickness direction of the first-lower-plastic-member body, the depth $h1$ of the first deformation portion is $0.6\pm0.1$ mm, the height $h2$ of the first part is $6.0\pm0.5$ mm, and the height $h3$ of the second part is $1.4\pm0.5$ mm.

In a possible implementation, the first part protrudes from one end of the first bottom surface and includes a first block, a first side block, and a second side block. The second part includes a first reinforcing rib and a second reinforcing rib that protrude from two opposite sides of the first bottom surface respectively. The first deformation portion defines a first notch and a second notch. The first notch is part of the first deformation portion between the first reinforcing rib and the first side block. The second notch is part of the first deformation portion between the second reinforcing rib and the second side block.

In a possible implementation, in a length direction of the first lower plastic member, a length $d1$ of the first notch is $6.0\pm0.5$ mm, and a length $d2$ of the second notch is $6.0\pm0.5$ mm.

In a possible implementation, the first deformation portion further defines a first sub-notch. The first sub-notch extends through the first top surface and the first bottom surface and is in communication with the first notch. The first sub-notch extends away from the first notch in a width direction of the first-lower-plastic-member body. A projection of the first notch falls within a projection of the first sub-notch in the thickness direction of the first-lower-plastic-member body.

In a possible implementation, the first deformation portion further defines a second sub-notch. The second sub-notch extends through the first top surface and the first bottom surface and is in communication with the second notch. The second sub-notch extends away from the second notch in the width direction of the first-lower-plastic-member body. A projection of the second notch falls within a projection of the second sub-notch in the thickness direction of the first-lower-plastic-member body.

In a possible implementation, the lower plastic assembly further includes a second lower plastic member. The second lower plastic member includes a second-lower-plastic-member body. The second-lower-plastic-member body has a second top surface and a second bottom surface opposite the second top surface.

The second-lower-plastic-member body includes a third part, a fourth part, and a second deformation portion. The second deformation portion is connected between the third part and the fourth part in a length direction of the second-lower-plastic-member body. A depth $h4$ of the second deformation portion is less than both a height $h5$ of the third part and a height $h6$ of the fourth part in a thickness direction of the second-lower-plastic-member body.

In a possible implementation, the third part protrudes from one end of the second bottom surface and includes a second block, a third side block, and a fourth side block. The fourth part includes a third reinforcing rib and a fourth reinforcing rib that protrude from two opposite sides of the second bottom surface respectively. The second deformation portion defines a third notch and a fourth notch. The third notch is part of the second deformation portion between the third reinforcing rib and the third side block. The fourth notch is part of the second deformation portion between the fourth reinforcing rib and the fourth side block.

In a possible implementation, in a length direction of the second lower plastic member, a length $d3$ of the third notch is $6.0\pm0.5$ mm, and a length $d4$ of the fourth notch is $6.0\pm0.5$ mm.

In a possible implementation, the second deformation portion further defines a third sub-notch. The third sub-notch extends through the second top surface and the second bottom surface and is in communication with the third notch. The third sub-notch extends away from the third notch in a width direction of the second-lower-plastic-member body. A projection of the third notch falls within a projection of the third sub-notch in the thickness direction of the second-lower-plastic-member body.

In a possible implementation, the second deformation portion further defines a fourth sub-notch. The fourth sub-notch extends through the second top surface and the second bottom surface and is in communication with the fourth notch. The fourth sub-notch extends away from the fourth notch in the width direction of the second-lower-plastic-member body. A projection of the fourth notch falls within a projection of the fourth sub-notch in the thickness direction of the second-lower-plastic-member body.

In a possible implementation, the first lower plastic member and the second lower plastic member are integrally formed. The first deformation portion is disposed at one end of the first lower plastic member away from the second lower plastic member. The second deformation portion is disposed at one end of the second lower plastic member away from the first lower plastic member.

In a possible implementation, the first lower plastic member includes a first explosion-proof grid located at one end of the first lower plastic member away from the first part. The first explosion-proof grid defines multiple first gaps extending through the first top surface and the first bottom surface.

In a possible implementation, each of the multiple first gaps has a width w/ranging from 0.8 mm to 1.3 mm.

In a possible implementation, the first explosion-proof grid includes multiple first grids. Each two adjacent first grids define one of the multiple first gaps.

For each of the multiple first grids, a bottom surface of the first grid is a first inclined surface. The first inclined surface has a first boundary line and a second boundary line in a length direction of the first grid. The second boundary line is closer to the first notch and the second notch than the first boundary line. The first inclined surface is inclined and extends from the second boundary line to the first boundary line in a first direction. The first direction is a direction in which the first grid protrudes from the first bottom surface.

In a possible implementation, the first lower plastic member defines a first through recess. The first through recess has a first side wall and a second side wall opposite the first side wall. The multiple first grids are received in the first through recess. One end of each of the multiple first grids is fixed to the first side wall, and the other end of each of the multiple first grids is fixed to the second side wall and is inclined towards the first bottom surface.

In a possible implementation, the first lower plastic member further includes a first gas hole and a first protective grid. The first gas hole extends through the first top surface and the first bottom surface. The first protective grid is disposed on the first bottom surface in a thickness direction of the first lower plastic member and covers the first gas hole. The first protective grid defines an exhaust region in communication with the first gas hole.

In a possible implementation, the lower plastic assembly further includes a second lower plastic member. The second lower plastic member includes a second-lower-plastic-member body, a second explosion-proof grid, and a third explosion-proof grid. The third explosion-proof grid is located at one end of the second lower plastic member. The second explosion-proof grid is adjacent to the third explosion-proof grid and defines multiple second gaps extending through the second-lower-plastic-member body. The third explosion-proof grid defines multiple through sub-recesses extending through the second-lower-plastic-member body.

In a possible implementation, the second-lower-plastic-member body has a second top surface and a second bottom surface. A protrusion is disposed at one end of the second bottom surface. The third explosion-proof grid extends through the protrusion and the second top surface. The second explosion-proof grid extends through the second top surface and the second bottom surface.

In a possible implementation, each of the multiple second gaps has a width w2 ranging from 0.8 mm to 1.3 mm.

In a possible implementation, the second explosion-proof grid includes multiple second grids. Each two adjacent second grids define one of the multiple second gaps.

For each of the multiple second grids, a bottom surface of the second grid is a second inclined surface. The second inclined surface has a third boundary line and a fourth boundary line in a length direction of the second grid. The second inclined surface is inclined and extends from the fourth boundary line to the third boundary line in a second direction, where the second direction is a direction in which the second grid protrudes from the second bottom surface.

In a possible implementation, the second lower plastic member defines a second through recess extending through the second top surface and the second bottom surface. The multiple second grids are received in the second through recess. The second through recess includes a third side wall and a fourth side wall opposite the third side wall. One end of each of the multiple second grids is fixed to the third side wall, and the other end of each of the multiple second grids is fixed to the fourth side wall and is inclined towards the second bottom surface.

In a possible implementation, the second lower plastic member further includes a third through recess defined at one side of the second through recess. The third through recess extends through the second top surface and the second bottom surface. The third explosion-proof grid is received in the third through recess.

In a possible implementation, the second lower plastic member further includes a second gas hole and a second protective grid. The second gas hole extends through the second top surface and the second bottom surface. The second protective grid is disposed on the second bottom surface in a thickness direction of the second lower plastic member and covers the second gas hole. The second protective grid defines an exhaust region in communication with the second gas hole.

In a possible implementation, an explosion-proof valve is disposed on the energy-storage apparatus. When the lower plastic assembly is mounted to the energy-storage apparatus, the first explosion-proof grid of the first lower plastic member faces the explosion-proof valve, and the second explosion-proof grid and the third explosion-proof grid of the second lower plastic member face the explosion-proof valve. The second explosion-proof grid, the third explosion-proof grid, and the first explosion-proof grid are arranged in sequence and cooperate to form an arched explosion-proof grid (A) protruding away from the explosion-proof valve. The explosion-proof valve faces the arched explosion-proof grid in a thickness direction of the first lower plastic member and the arched explosion-proof grid is located below the explosion-proof valve.

In a second aspect, an end cover assembly is provided in the disclosure. The end cover assembly includes an upper cover and the lower plastic assembly described above. The first lower plastic member and the second lower plastic member are stacked to one side of the upper cover. One end of the first lower plastic member faces and abuts against one end of the second lower plastic member. The first lower plastic member and the second lower plastic member are arranged side by side in a length direction of the upper cover. A dimension L2 of the second lower plastic member is greater than a dimension L1 of the first lower plastic member.

In a possible implementation, in the length direction of the upper cover, a ratio L2/L1 of the length L2 of the second lower plastic member to the length L1 of the first lower plastic member ranges from 1.1 to 1.4.

In a possible implementation, the upper cover includes an explosion-proof valve. The first lower plastic member includes the first explosion-proof grid defining the multiple first gaps that extend through the first top surface and the first bottom surface. The second lower plastic member includes a second explosion-proof grid, a third explosion-proof grid adjacent to the second explosion-proof grid, and a protrusion protruding from the second bottom surface. The second explosion-proof grid defines multiple second gaps extending through the second top surface and the second bottom surface. The third explosion-proof grid defines a through recess extending through the second top surface and the protrusion. The second explosion-proof grid, the third explosion-proof grid, and the first explosion-proof grid are arranged in sequence and cooperate to form an arched explosion-proof grid protruding away from the explosion-proof valve. The explosion-proof valve faces the arched explosion-proof grid in a thickness direction of the upper cover and the arched explosion-proof grid is located below the explosion-proof valve.

In a possible implementation, the first lower plastic member includes the first explosion-proof grid. The second lower plastic member includes the second explosion-proof grid and the third explosion-proof grid adjacent to the second explosion-proof grid. The second explosion-proof grid, the third explosion-proof grid, and the first explosion-proof grid are arranged in sequence in the length direction of the upper cover. A sum of a length of the second explosion-proof grid, a length of the third explosion-proof grid, and a length of the first explosion-proof grid is greater than or equal to a length of the explosion-proof valve of the end cover assembly in the length direction of the upper cover.

In a third aspect, an energy-storage apparatus is provided in the disclosure. The energy-storage apparatus includes a housing, an electrode assembly, and the end cover assembly described above. The housing defines an opening and an accommodation cavity. The electrode assembly is accommodated in the accommodation cavity. The end cover assembly covers the opening.

In a fourth aspect, an electronic device is provided in the disclosure. The electronic device the energy-storage apparatus described above. The energy-storage apparatus is configured to power the electronic device.

BRIEF DESCRIPTION OF THE DRAWINGS

In order to describe technical solutions in the disclosure more clearly, the following will give a brief introduction to accompanying drawings required for describing the implementations. The accompanying drawings hereinafter described illustrate some implementations of the disclosure. Based on the accompanying drawings, those of ordinary skills in the art can also obtain other drawings without creative effort.

Reference signs: 1000: energy-storage apparatus, 100: end cover assembly, 200: electrode assembly, 30: lower plastic assembly, 40: upper cover, 41: upper cover body, 411: front face, 412: back face, 413: through recess, 414: first boss, 4141: first upper wall, 415: second boss, 4151: second upper wall, 417: first mounting recess, 418: second mounting recess, 42: positive-post through-hole, 43: negative-post through-hole, 44: explosion-proof valve, 45: first flipping sheet, 46: second flipping sheet, 47: liquid injection hole, 10: first lower plastic member, 11: first-lower-plastic-member body, 111: first top surface, 112: first bottom surface, 113: first through recess, 1131: first side wall, 1132: second side wall, 116: second part, 116a: first reinforcing rib, 116b: second reinforcing rib, 117: first recess, 118: first boss, 1181: baffle, 1182: first side plate, 1183: second side plate, 119: first part, 1191: first block, 1192: first side block, 1193: second side block, 12: first snapped protrusion, 13: first explosion-proof grid, 132: first grid, 1321: first inclined surface, 1322: first boundary line, 1323: second boundary line, 14: first liquid-injection through-hole, 15: first gas hole, 16: first protective grid, 17: first terminal-post through-hole, 20: second lower plastic member, 21: second-lower-plastic-member body, 211: second top surface, 212: second bottom surface, 213: second through recess, 2131: third side wall, 2132: fourth side wall, 214: third through recess, 215: through sub-recess, 216: fourth part, 216a: third reinforcing rib, 216b: fourth reinforcing rib, 217: second recess, 218: third part, 2181: second block, 2182: third side block, 2183: fourth side block, 22: second snapped protrusion, 23: second explosion-proof grid, 232: second grid, 2321: second inclined surface, 2322: third boundary line, 2323: fourth boundary line, 24: third explosion-proof grid, 242: first divider, 243: second divider, 25: second gas hole, 26: second protective grid, 27: second terminal-post through-hole, 28: protrusion, 50: upper plastic assembly, 51: first upper plastic member, 52: second upper plastic member, 60: pressing block assembly, 61: first pressing block, 62: second pressing block, 70: electrode post, 71: positive terminal post, 711: first cylinder, 712: first flange portion, 72: negative terminal post, 721: second cylinder, 722: second flange portion, A: arched explosion-proof grid, B: first notch, C: second notch, D: third notch, E: fourth notch.

DETAILED DESCRIPTION

In order to describe technical solutions in the disclosure more clearly, accompanying drawings required for describing implementations are briefly introduced below. Apparently, the accompanying drawings in the following illustration are merely some implementations of the disclosure. Those of ordinary skill in the art may also obtain other drawings based on these accompanying drawings without creative efforts.

Figure 1:
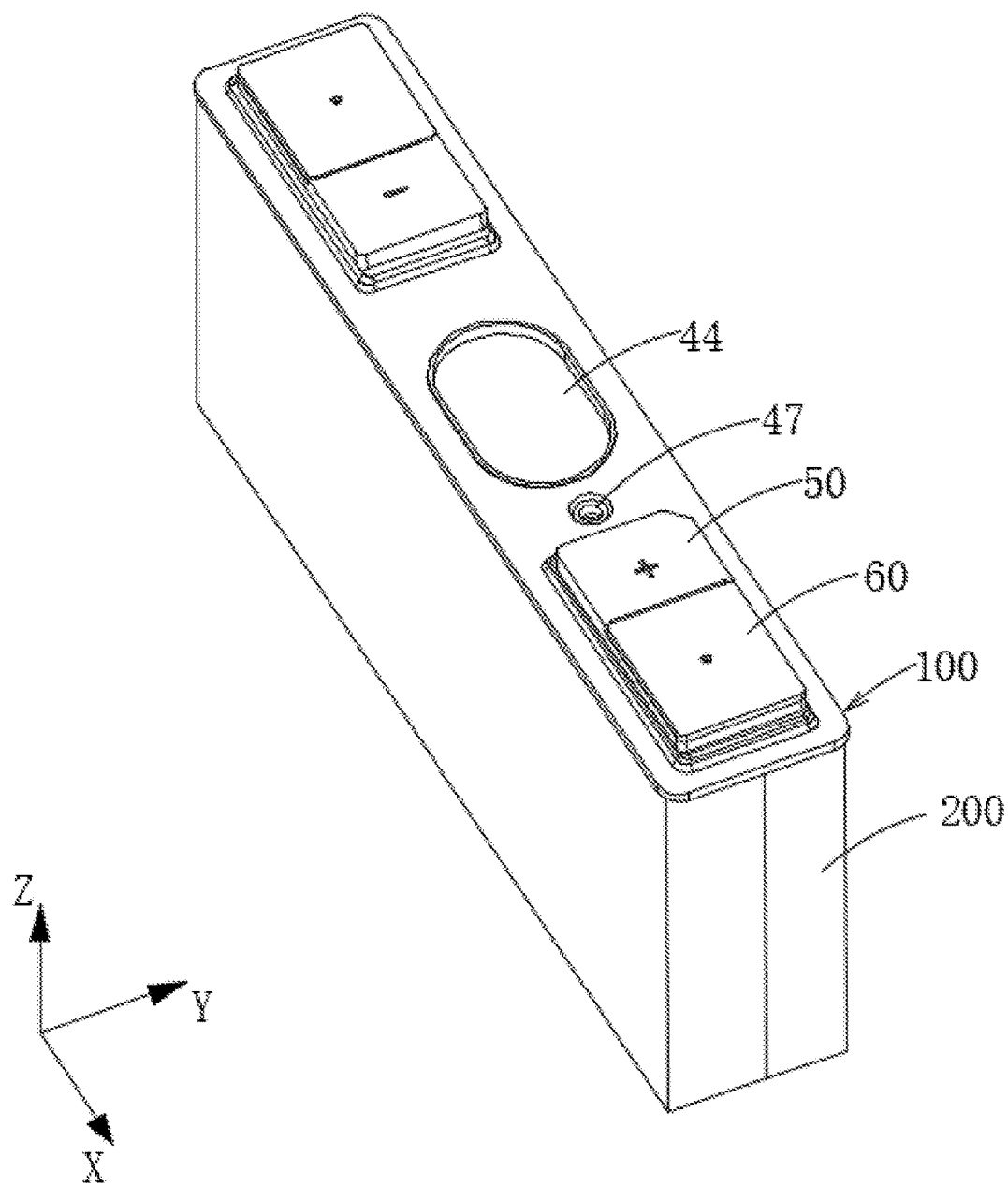
FIG. 1 is a schematic structural view of an energy-storage apparatus provided in implementations of the disclosure.
Figure 2:
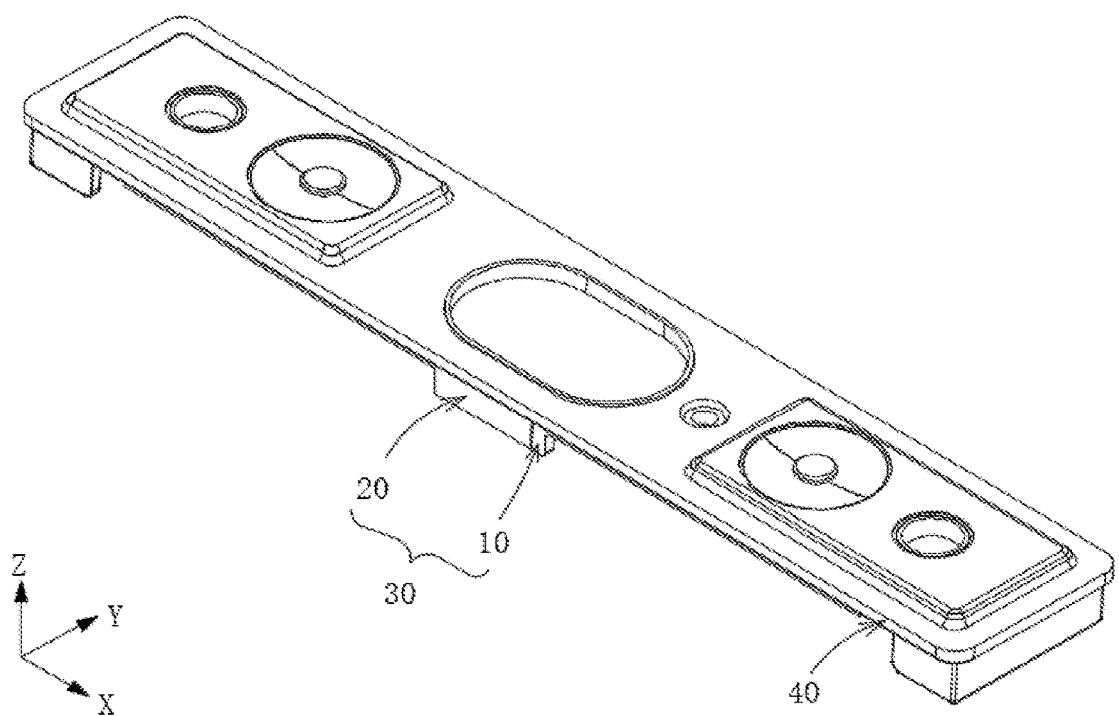
FIG. 2 is a schematic structural view of an end cover assembly of the energy-storage apparatus in FIG. 1.

Refer to FIG. 1 and FIG. 2, where FIG. 1 is a schematic structural view of an energy-storage apparatus provided in implementations of the disclosure, and FIG. 2 is a schematic structural view of an end cover assembly of the energy-storage apparatus in FIG. 1.

For the convenience of illustration, a length direction of an end cover assembly illustrated in FIG. 1 is defined as an X-axis direction, a width direction of the end cover assembly is defined as a Y-axis direction, a height direction of the end cover assembly is defined as a Z-axis direction, and the X-axis direction, the Y-axis direction, and the Z-axis direction are perpendicular to each other. Terms such as "upper" and "lower" for describing implementations of the disclosure are described based on orientations as illustrated in FIG. 1 of the specification. "Upper" refers to a direction towards a positive direction of the Z-axis, and "lower" refers to a direction towards a negative direction of the Z-axis, which do not form a limitation to the energy-storage apparatus in practical application scenarios.

An end cover assembly 100 is provided in the disclosure. The end cover assembly 100 includes a lower plastic assembly 30. An energy-storage apparatus 1000 including the end cover assembly 100 and an electronic device (not illustrated) using the energy-storage apparatus 1000 are further provided in the disclosure. For example, the electronic device may be a vehicle. The vehicle may be a fuel vehicle, a gas vehicle, or a new energy vehicle. The new energy vehicle may be a pure electric vehicle, a hybrid electric vehicle, an extended-range electric vehicle, etc. A vehicle may include a battery, a controller, and a motor. The battery may be configured to power the controller and the motor, and may be used as a power supply for operation and driving of the vehicle. For example, the battery may be used for operational power requirements during starting, navigation, and operation of the vehicle. For another example, the battery may power the controller, the controller may control the battery to power the motor, the motor may receive power from the battery and may use the power to drive the vehicle, thereby replacing or partially replacing fuel oil or natural gas to provide driving power for the vehicle.

In the implementations of the disclosure, the lower plastic assembly 30, the end cover assembly 100, the energy-storage apparatus 1000, and the electronic device solve a technical problem that a lower plastic member is prone to warping under compression during assembly.

In some implementations, for example, the energy-storage apparatus 1000 is a battery. The energy-storage apparatus 1000 includes a housing (not illustrated in FIG. 1), an end cover assembly 100, and an electrode assembly 200. The housing defines an opening and an accommodation cavity. The electrode assembly 200 is accommodated in the accommodation cavity. The end cover assembly 100 covers the opening. It can be understood that the energy-storage apparatus 1000 may include, but is not limited to, a battery cell, a battery module, a battery pack, a battery system, etc. When the energy-storage apparatus 1000 is a battery cell, the energy-storage apparatus 1000 may be a prismatic battery. A practical application scenario of the energy-storage apparatus 1000 provided in the implementation of the disclosure may be, but is not limited to, the listed products, and may also be other application scenarios, which is not strictly limited in the implementation of the disclosure.

Figure 3:
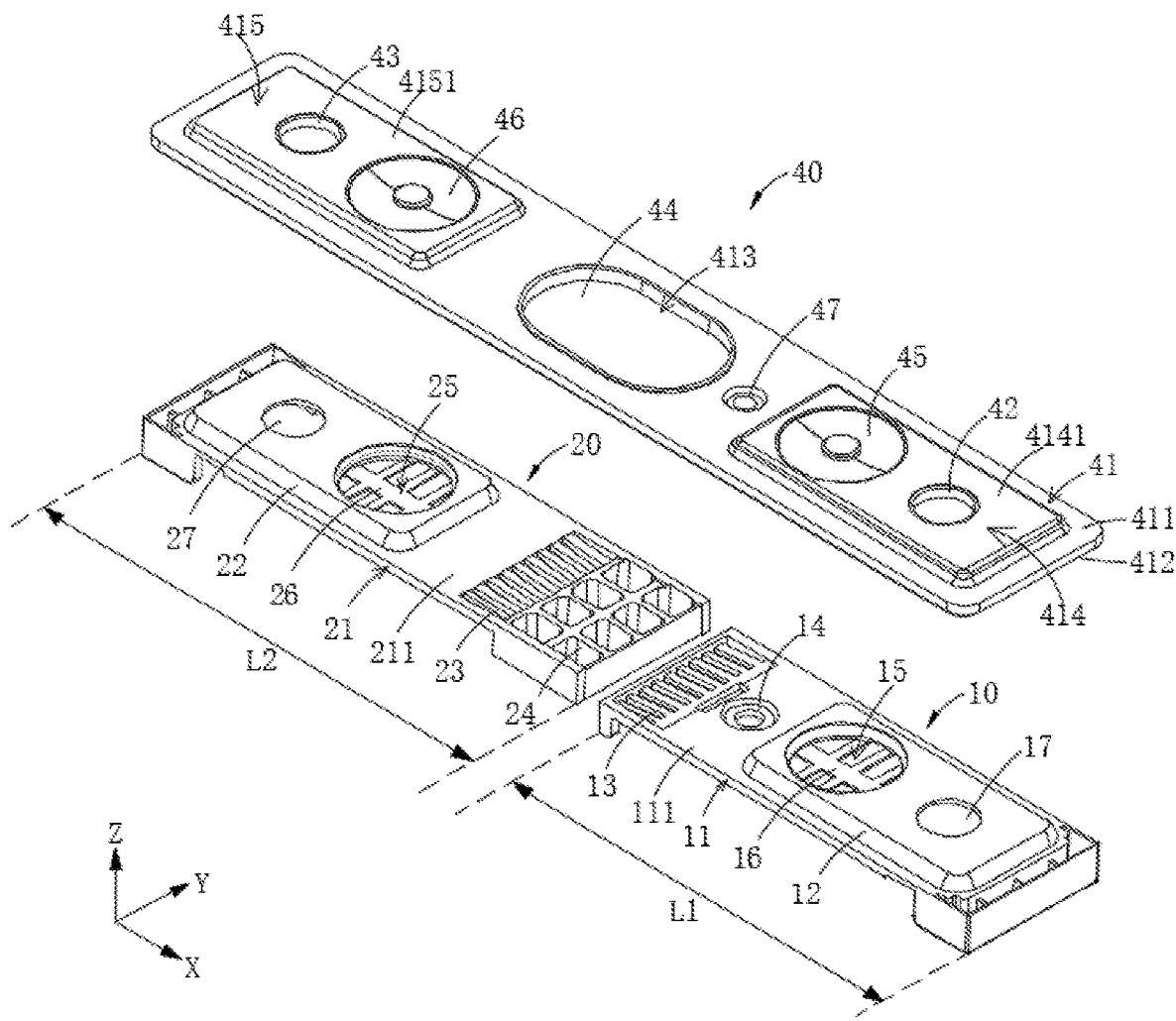
FIG. 3 is an exploded structural view of the end cover assembly in FIG. 2.
Figure 4:
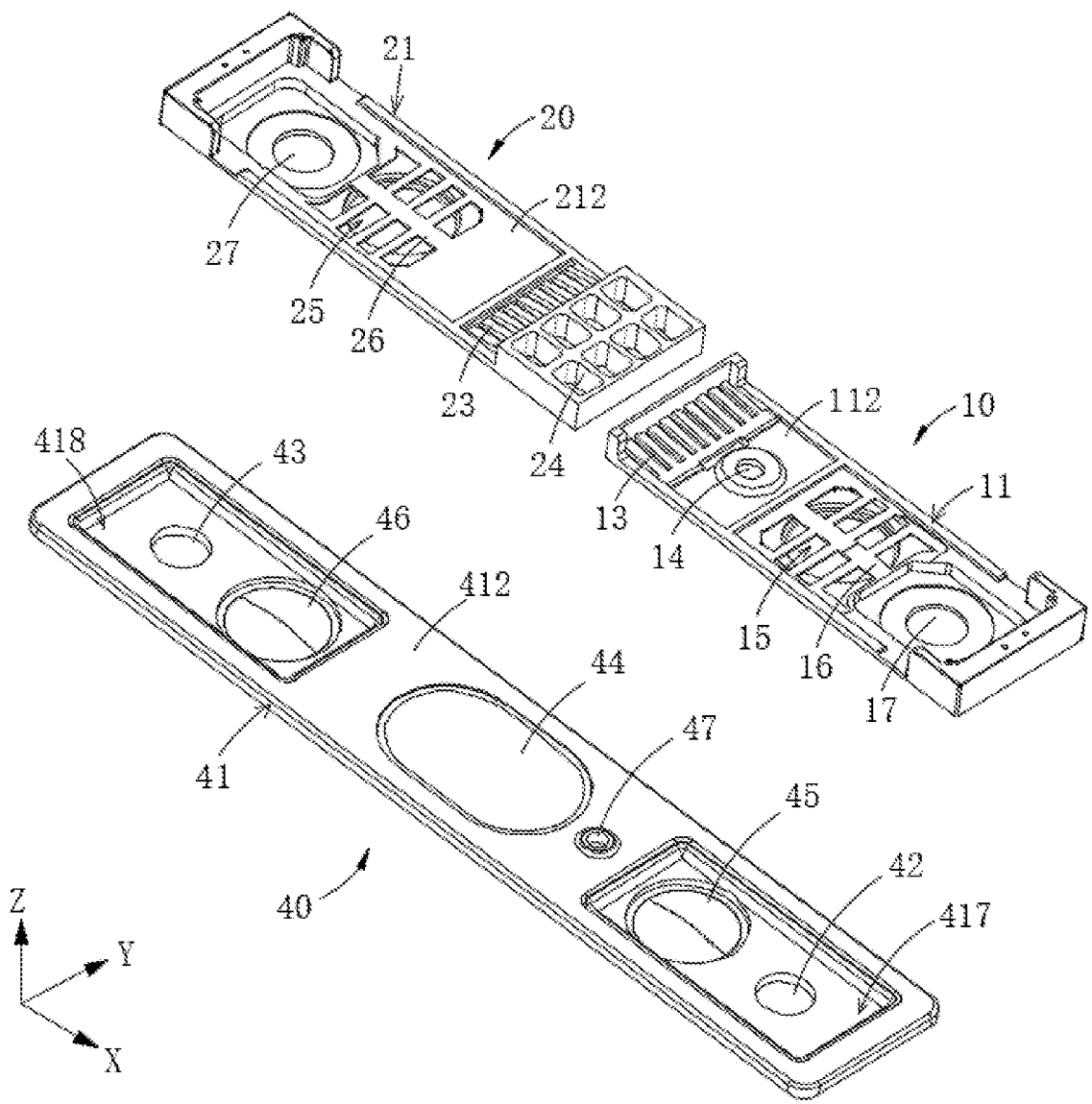
FIG. 4 is an exploded structural view of the end cover assembly in FIG. 2 from another view.

Referring to FIGS. 2 to 4, the end cover assembly 100 includes the lower plastic assembly 30 and an upper cover 40 stacked with the lower plastic assembly 30. The lower plastic assembly 30 is used to insulate the upper cover 40 from the electrode assembly 200. The lower plastic assembly 30 is made of plastic.

In the implementations, the lower plastic assembly 30 includes a first lower plastic member 10 and a second lower plastic member 20. The first lower plastic member 10 and the second lower plastic member 20 are arranged side by side at one side of the upper cover 40 in X-axis direction. The first lower plastic member 10 and the second lower plastic member 20 are stacked with the upper cover 40. A sum of a length of the first lower plastic member 10 and a length of the second lower plastic member 20 is equal to a length of the upper cover 40. Each of a width of the first lower plastic member 10 and a width of the second lower plastic member 20 is substantially equal to a width of the upper cover 40, and a certain tolerance range is allowed.

In the implementations, the upper cover 40 includes an upper cover body 41, a positive-post through-hole 42, a negative-post through-hole 43, an explosion-proof valve 44, a first flipping sheet 45, a second flipping sheet 46, and a liquid injection hole 47. The positive-post through-hole 42, the first flipping sheet 45, the liquid injection hole 47, the explosion-proof valve 44, the second flipping sheet 46, and the negative-post through-hole 43 are sequentially arranged at intervals in the X-axis direction (that is, a length direction of the upper cover body 41).

Specifically, the upper cover body 41 is an elongated plate, includes a front face 411 and a back face 412 opposite the front face 411, and defines a first mounting recess 417 and a second mounting recess 418. The first mounting recess 417 and the second mounting recess 418 are located at opposite ends (arranged in the X-axis direction) of the back face 412 of the upper cover body 41. The first mounting recess 417 and the second mounting recess 418 are substantially rectangular. The first mounting recess 417 is recessed from the back face 412 towards the front face 411 and forms a first boss 414 at the front face 411. The second mounting recess 418 is recessed from the back face 412 towards the front face 411 and forms a second boss 415 at the front face 411.

The first boss 414 has a first upper wall 4141. The first upper wall 4141 exceeds the front face 411 and is parallel to the front face 411, and a certain tolerance range is allowed. A back face of the first upper wall 4141 serves as a lower wall of the first mounting recess 417. The positive-post through-hole 42 extends through the first upper wall 4141. A through hole (not illustrated) is defined at one side of the first upper wall 4141 where the positive-post through-hole 42 is located. The first flipping sheet 45 is a circular thin sheet, and is accommodated in the through hole and welded with a hole wall of the through hole.

The second boss 415 has a second upper wall 4151. The second upper wall 4151 exceeds the front face 411 and is parallel to the front face 411, and a certain tolerance range is allowed. A back face of the second upper wall 4151 serves as a lower wall of the second mounting recess 418. The negative-post through-hole 43 extends through the second upper wall 4151. A through hole (not illustrated) is defined at one side of the second upper wall 4151 where the negative-post through-hole 43 is located. The second flipping sheet 46 is a circular thin sheet, and is accommodated in the through hole and welded with a hole wall of the through hole.

The explosion-proof valve 44 is located at the middle of the upper cover body 41. The upper cover body 41 further defines a through recess 413 extending through the back face 412 and the front face 411, where the through recess 413 is located between the first mounting recess 417 and the second mounting recess 418. The explosion-proof valve 44 is accommodated in the through recess 413 and is welded with a wall of the through recess 413. When an internal pressure of the electrode assembly 200 is excessively high, the explosion-proof valve 44 will automatically open to relieve the pressure, thereby avoiding an explosion.

It can be understood that, the positive-post through-hole 42 is disposed at one end of the upper cover body 41 and the negative-post through-hole 43 is disposed at the other end of the upper cover body 41, and a positive terminal post may extend through the positive-post through-hole 42 and a negative terminal post of the battery may extend through the negative-post through-hole 43. The first flipping sheet 45 is disposed at one side of the positive-post through-hole 42 close to the explosion-proof valve 44, and the second flipping sheet 46 is disposed at one side of the negative-post through-hole 43 close to the explosion-proof valve 44. When the internal pressure of the electrode assembly 200 is relatively high, the first flipping sheet 45 or the second flipping sheet 46 will bend and deform upwards to abut against a metal pressing block, so that the battery is short-circuited to provide a protective effect.

The liquid injection hole 47 is disposed between the first flipping sheet 45 and the explosion-proof valve 44. During liquid injection for a secondary battery, an electrolyte is injected into the battery through the liquid injection hole 47 on the upper cover 40.

In the disclosure, the lower plastic assembly 30 includes a first lower plastic member 10. The first lower plastic member 10 includes a first-lower-plastic-member body 11. The first-lower-plastic-member body 11 has a first top surface 111 and a first bottom surface 112 opposite the first top surface 111, and further includes a first part 119, a second part 116, and a first deformation portion. The first deformation portion is located between the first part 119 and the second part 116 in a length direction of the first-lower-plastic-member body 11. The first part 119 protrudes from one end of the first bottom surface 112 and includes a first block 1191, a first side block 1192, and a second side block 1193. The second part 116 includes a first reinforcing rib 116a and a second reinforcing rib 116b that protrude from two opposite sides of the first bottom surface 112 respectively. The first deformation portion defines a first notch B and a second notch C. The first notch B is part of the first deformation portion between the first deformation portion between the first reinforcing rib 116a and the first side block 1192. The second notch C is part of the first deformation portion between the second reinforcing rib 116b and the second side block 1193.

Detailed illustration will be given below with reference to the accompanying drawings.

Figure 5:
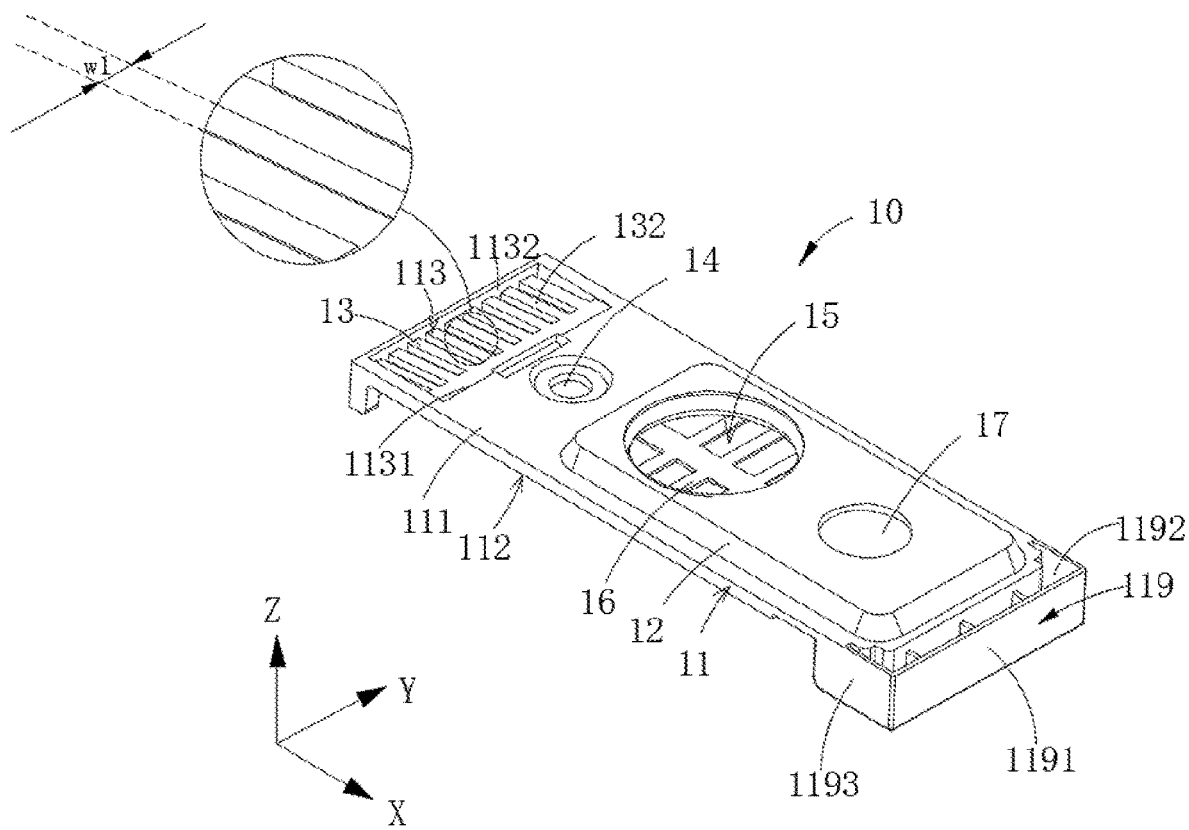
FIG. 5 is a schematic structural view of a first lower plastic member of the lower plastic assembly in FIG. 3.
Figure 6:
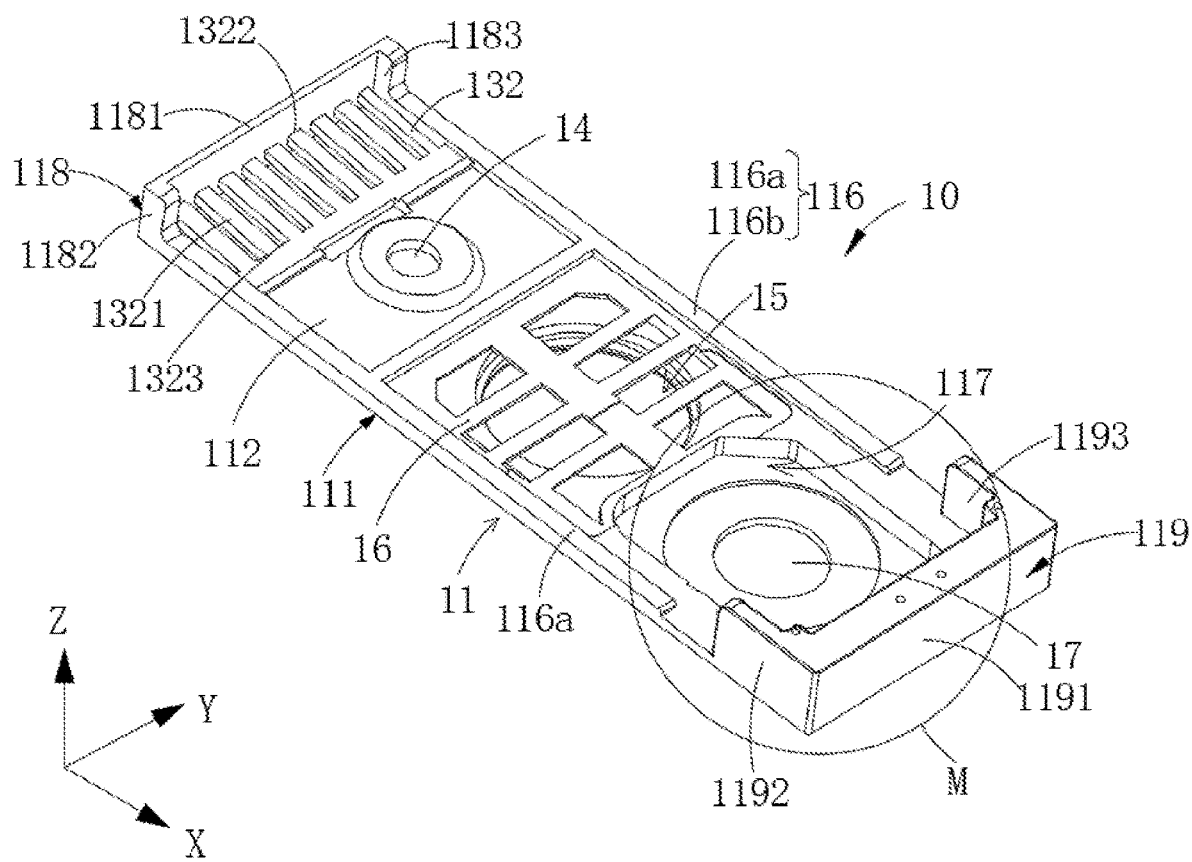
FIG. 6 is a schematic structural view of the first lower plastic member of the lower plastic assembly in FIG. 5 from another view.

Referring to FIG. 5 and FIG. 6 together, in the implementations, the first lower plastic member 10 includes the first-lower-plastic-member body 11 and a first snapped protrusion 12. In a Z-axis direction, the first-lower-plastic-member body 11 is a substantially rectangular thin plate. The first-lower-plastic-member body 11 has a first top surface 111 and a first bottom surface 112 opposite the first top surface 111. Specifically, the first snapped protrusion 12 protrudes from the first top surface 111 of the first-lower-plastic-member body 11 and is located at one end of the first-lower-plastic-member body 11 in a length direction (i.e., X-axis direction) of the first lower plastic member 10. The first-lower-plastic-member body 11 further defines a first through recess 113 at one end away from the first snapped protrusion 12. The first through recess 113 is rectangular and extends through the first top surface 111 and the first bottom surface 112. The first through recess 113 has a first side wall 1131 and a second side wall 1132 that are opposite to each other in the length direction (i.e., X-axis direction) of the first lower plastic member 10. The first through recess 13 is configured to direct pressure-gas generated in the electrode assembly 200 to the explosion-proof valve 44.

In the implementations, the first lower plastic member 10 further includes a first explosion-proof grid 13 and a first protective grid 16. The first-lower-plastic-member body 11 further defines a first liquid-injection through-hole 14, a first gas hole 15, and a first terminal-post through-hole 17. The first explosion-proof grid 13, the first liquid-injection through-hole 14, the first gas hole 15, and the first terminal-post through-hole 17 are sequentially arranged on the first-lower-plastic-member body 11 in the length direction (i.e., X-axis direction) of the first lower plastic member 10. The first protective grid 16 is disposed at the first gas hole 15.

In the implementations, the first explosion-proof grid 13 is received in the first through recess 113 and includes multiple first grids 132 arranged side by side and at intervals. One end of each of the multiple first grids 132 is fixed to the first side wall 1131 of the first through-recess 113. The multiple first grids 132 extend towards the second side wall 1132 located at the end of the first-lower-plastic-member body 11. The other end of each of the multiple first grids 132 is fixed to the second side wall 1132 of the first through recess 113. The other end of each of the multiple first grids 132 fixed to the second side wall 1132 is inclined towards the first bottom surface 112. A bottom surface of the first grid 132 is a first inclined surface 1321. The first inclined surface 1321 has a first boundary line 1322 and a second boundary line 1323 in a length direction of the first grid 132. The second boundary line 1323 is closer to the first notch B and the second notch C than the first boundary line 1322. The first inclined surface 1321 is inclined and extends from the second boundary line 1323 to the first boundary line 1322 in a first direction. The first direction is a direction in which the first grid 132 protrudes from the first bottom surface 112. Each two adjacent first grids 132 define a first gap therebetween and the first gap is elongated, and gas can flow through the first gap. In the implementations, in the length direction of the first lower plastic member 10, the first gap has a width w1 ranging from 0.8 mm to 1.3 mm. The width of the first gap is a distance between each two adjacent first grids 132. In a width direction of the first lower plastic member 10, a first gap is also defined between the outermost first grid 132 among the multiple first grids 132 and a wall of the first through recess 113. It needs to be noted that, the width of the first gap may be 0.8 mm, 1.3 mm, or any value ranging from 0.8 to 1.3, such as 0.9, 1.0, 1.1, 1.2, etc.

The first liquid-injection through-hole 14 extends through the first top surface 111 and the first bottom surface 112 of the first-lower-plastic-member body 11. The first liquid-injection through-hole 14 is adjacent to the first explosion-proof grid 13 and is configured to cooperate with the liquid injection hole 47 to enable the electrolyte to flow into the electrode assembly 200.

Each of the first terminal-post through-hole 17 and the first gas hole 15 is circular and extends through the first top surface 111 and the first bottom surface 112. Each of the first terminal-post through-hole 17 and the first gas hole 15 is defined on the first snapped protrusion 12, and the first terminal-post through-hole 17 is close to one end of the first-lower-plastic-member body 11. The first gas hole 15 is located between the first liquid-injection through-hole 14 and the first terminal-post through-hole 17. The positive terminal post can extend through the first terminal-post through-hole 17. The first gas hole 15 is configured to direct the pressure-gas generated in the electrode assembly 200 to the first flipping sheet 45.

The first protective grid 16 is a grid-shaped thin plate and formed on the first bottom face 112 of the first-lower-plastic-member body 11. The first protective grid 16 covers the first gas hole 15 in a thickness direction of the first-lower-plastic-member body 11, that is, covers the first gas hole 15. An area of the first protective grid 16 is greater than that of the first gas hole 15. The first protective grid 16 has an exhaust region (not illustrated), and the exhaust region is in communication with the first gas hole 15.

The first-lower-plastic-member body 11 further defines a first recess 117 that is recessed from the first bottom surface 112 and located at one end away from the first liquid-injection through-hole 14. The first terminal-post through-hole 17 extends through a lower wall of the first recess 117 in the thickness direction (i.e., Z-axis direction) of the first-lower-plastic-member body 11. The first recess 117 is adjacent to the first protective grid 16.

Figure 7:
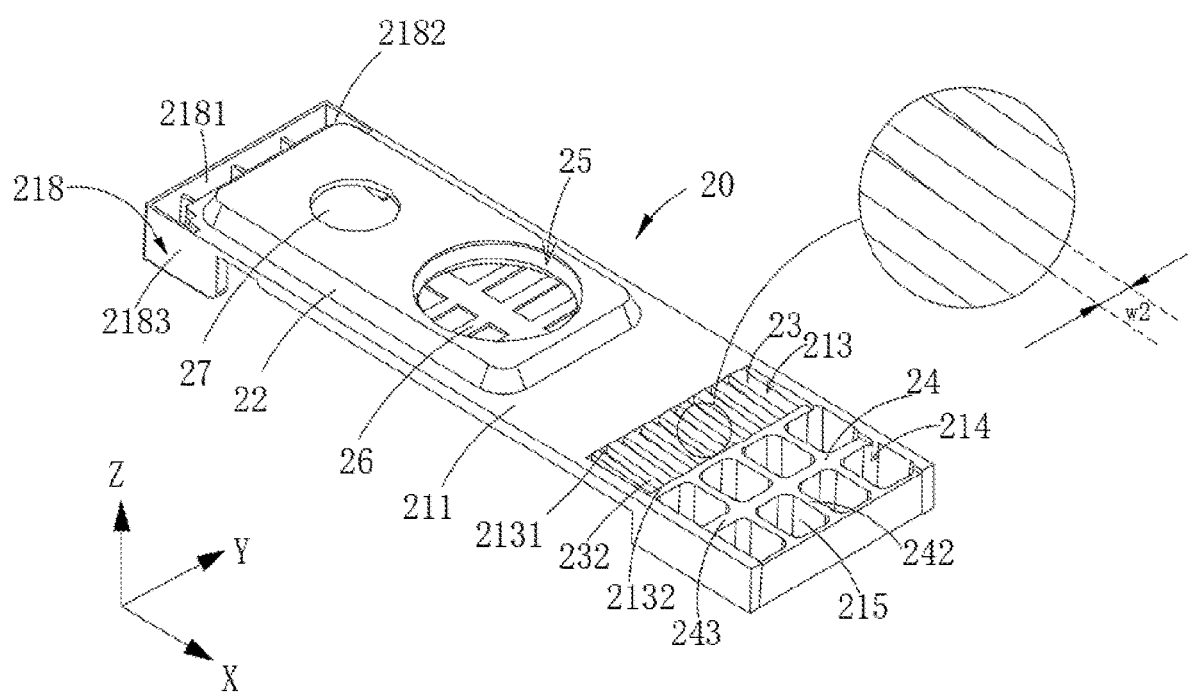
FIG. 7 is a schematic structural view of a second lower plastic member of the lower plastic assembly in FIG. 3.
Figure 8:
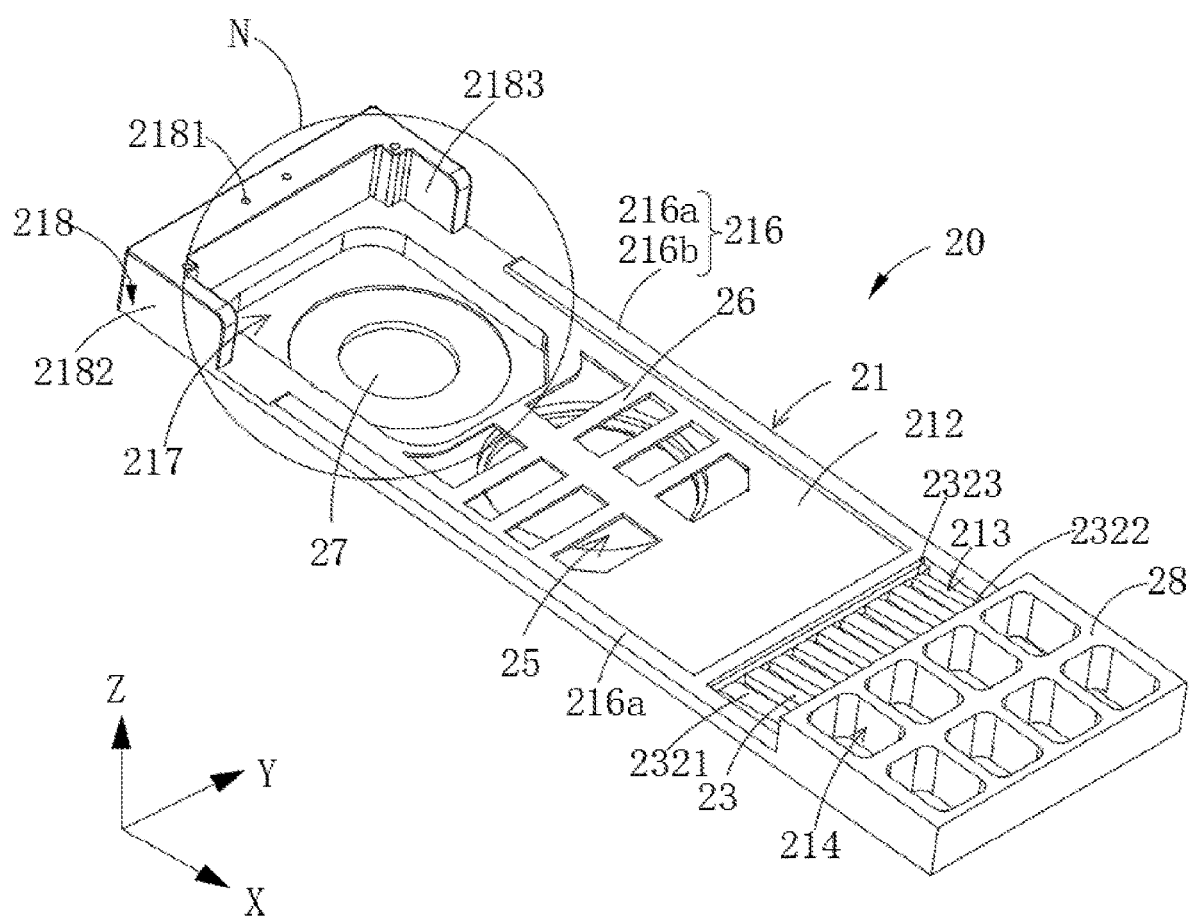
FIG. 8 is a schematic structural view of the second lower plastic member of the lower plastic assembly in FIG. 7 from another view.

Referring to FIG. 7 and FIG. 8 together, in the implementations, the second lower plastic member 20 includes a second-lower-plastic-member body 21 and a second snapped protrusion 22. In the Z-axis direction, the second-lower-plastic-member body 21 is a substantially rectangular thin plate and has a second top surface 211 and a second bottom surface 212 opposite the second top surface 211. Specifically, the second snapped protrusion 22 protrudes from the second top surface 211 of the second-lower-plastic-member body 21 and is located at one end of the second-lower-plastic-member body 21 in the X-axis direction.

The second-lower-plastic-member body 21 further defines a second through recess 213 and a third through recess 214 at one end away from the second snapped protrusion 22. The second through recess 213 and the third through recess 214 are disposed side by side at intervals in the X-axis direction. The second through recess 213 is rectangular and extends through the second top surface 211 and the second bottom surface 212. The second through recess 213 has a third side wall 2131 and a fourth side wall 2132, which are opposite to each other in the X-axis direction. The third through recess 214 is rectangular and extends through the second top surface 211 and the second bottom surface 212. The second through recess 213 and the third through recess 214 are both configured to direct pressure-gas generated in the electrode assembly 200 to the explosion-proof valve 44.

In the implementations, the second lower plastic member 20 further includes a second explosion-proof grid 23, a third explosion-proof grid 24, a second gas hole 25, a second protective grid 26, and a second terminal-post through-hole 27. The third explosion-proof grid 24, the second explosion-proof grid 23, the second gas hole 25, and the second terminal-post through-hole 27 are sequentially arranged on the second-lower-plastic-member body 21 in the length direction (i.e., X-axis direction) of the second lower plastic member 20. The second protective grid 26 is disposed at the second gas hole 25.

The second explosion-proof grid 23 is received in the second through recess 213 and includes multiple second grids 232 arranged side by side at intervals. One end of each of the multiple second grids 232 is fixed to the third side wall 2131 of the second through recess 213, and the multiple second grids 232 extend towards the fourth side wall 2132 located at one end of the second-lower-plastic-member body 21. The other end of each of the multiple second grids 232 is fixed to the fourth side wall 2132 of the second through recess 213, and is inclined towards the second bottom surface 212. A bottom surface of the second grid 232 is a second inclined surface 2321. The second inclined surface 2321 has a third boundary line 2322 and a fourth boundary line 2323 in a length direction of the second grid 232. The fourth boundary line 2323 is closer to the third notch D and the fourth notch E than the third boundary line 2322. The second inclined surface 2321 is inclined and extends from the fourth boundary line 2323 to the third boundary line 2322 in a second direction. The second direction is a direction in which the second grid 232 protrudes from the second bottom surface 212.

The third explosion-proof grid 24 is received in the third through recess 214 and includes multiple first dividers 242 and a second divider 243. The multiple first dividers 242 are arranged side by side at intervals in the Y-axis direction. Each of the multiple first dividers 242 is connected to two opposite side walls of the third through recess 214 in the length direction (i.e., X-axis direction) of the second lower plastic member 20. The second divider 243 extends through the multiple first dividers 242 in the width direction (i.e., Y-axis direction) of the second lower plastic member, and connects two opposite side walls of the third through recess 214 in the width direction (i.e., Y-axis direction) of the second lower plastic member 20. It can be understood that the multiple first dividers 242 and the second divider 243 cooperate to define multiple through sub-recesses 215 in the third through recess 214. In the implementations, the number of the second dividers 243 is one, and in other implementations, the number of the second divider 243 may be two or more.

Each of the second terminal-post through-hole 27 and the second gas hole 25 is circular and extends through the second top surface 211 and the second bottom surface 212. Each of the second terminal-post through-hole 27 and the second gas hole 25 is located on the second snapped protrusion 22, and the second terminal-post through-hole 27 is close to one end of the second-lower-plastic-member body 21. The second gas hole 25 is located between the second through recess 213 and the second terminal-post through-hole 27. The negative pole can extend through the second terminal-post through-hole 27. The second gas hole 25 is configured to direct the pressure-gas generated in the electrode assembly 200 to the second flipping sheet 46. In other implementations, the second gas hole 25 may be in other shapes.

The second protective grid 26 is a grid-shaped thin plate and formed on the second bottom surface 212 of the second-lower-plastic-member body 21. In the thickness direction (i.e., Z-axis direction) of the second-lower-plastic-member body 21, the second protective grid 26 covers the second gas hole 25. In the thickness direction (i.e., Z-axis direction) of the second-lower-plastic-member body 21, an orthographic projection of the second protective grid 26 is larger than an orthographic projection of the second gas hole 25.

The second-lower-plastic-member body 21 further defines a second recess 217. The second recess 217 is recessed from the second bottom surface 212 and is located at one end of the second bottom surface 212 away from the second through recess 213. The second terminal-post through-hole 27 extends through a lower wall of the second recess 217 in the thickness direction (i.e., Z-axis direction) of the second-lower-plastic-member body 21. The second recess 217 is adjacent to the second protective grid 26.

Figure 9:
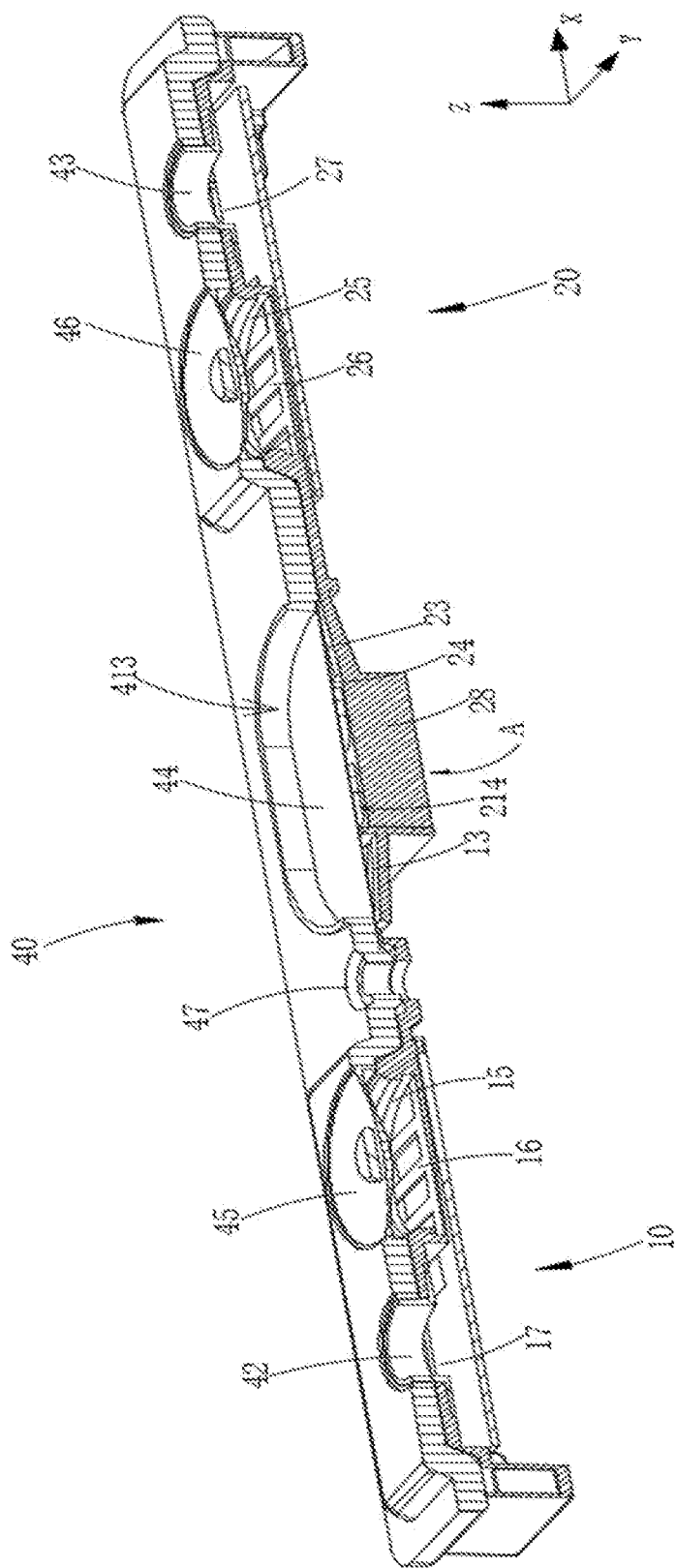
FIG. 9 is a schematic structural view illustrating the upper cover, the first lower plastic member, and second lower plastic member in FIG. 3 that are assembled together.

Refer to FIG. 9, where FIG. 9 is a schematic structural view illustrating the upper cover 40, the first lower plastic member 10, and second lower plastic member 20 that are assembled together. The first lower plastic member 10 is stacked to one side of the upper cover 40 where the liquid injection hole 47 is defined. The first top surface 111 of the first lower plastic member 10 faces and is attached to the back face 412 of the upper cover 40. The first snapped protrusion 12 is inserted into the first mounting recess 417. The first snapped protrusion 12 can be snapped into the first mounting recess 417 to achieve mutual positioning. In a thickness direction (i.e., Z-axis direction) of the upper cover 40, the first terminal-post through-hole 17 of the first lower plastic member 10 is coaxial with and in communication with the positive-post through-hole 42 of the upper cover 40. The first gas hole 15 of the first lower plastic member 10 is coaxial with the through hole of the upper cover 40 and faces the first flipping sheet 45. The first liquid-injection through-hole 14 of the first lower plastic member 10 is coaxial with and in communication with the liquid injection hole 47 of the upper cover 40. The first explosion-proof grid 13 of the first lower plastic member 10 faces part of the explosion-proof valve 44 of the upper cover 40.

The second lower plastic member 20 is stacked on the back face 412 of the upper cover 40. One end of the second lower plastic member 20 faces and abuts against one end of the first lower plastic member 10. Both the length direction of the second lower plastic member 20 and the length direction of the first lower plastic member 10 are the same as the length direction of the upper cover 40. The first lower plastic member 10 and the second lower plastic member 20 are arranged side by side in a length direction (i.e., X-axis direction) of the upper cover 40. In the length direction (i.e., X-axis direction) of the upper cover 40, a dimension L2 of the second lower plastic member 20 is greater than a dimension L1 of the first lower plastic member 10. Specifically, the second top surface 211 of the second lower plastic member 20 faces and is attached to the back face 412 of the upper cover 40, and the second snapped protrusion 22 is inserted into the second mounting recess 418. The second snapped protrusion 22 can be snapped into the second mounting recess 418 to achieve mutual positioning. In the thickness direction (i.e., Z-axis direction) of the upper cover 40, the second terminal-post through-hole 27 of the second lower plastic member 20 is coaxial with and in communication with the negative-post through-hole 43 of the upper cover 40. The second gas hole 25 of the second lower plastic member 20 is coaxial with the through hole of the upper cover 40 and faces the second flipping sheet 46. The second explosion-proof grid 23 and the third explosion-proof grid 24 of the second lower plastic member 20 face part of the explosion-proof valve 44 of the upper cover 40.

In this case, the first explosion-proof grid 13 of the first lower plastic member 10 faces and abuts against the third explosion-proof grid 24 of the second lower plastic member 20. In the length direction (i.e., X-axis direction) of the upper cover 40, the second explosion-proof grid 23, the third explosion-proof grid 24, and the first explosion-proof grid 13 are arranged in sequence. In the length direction (i.e., X-axis direction) of the upper cover 40, the sum of a length of the second explosion-proof grid 23, a length of the third explosion-proof grid 24, and a length of the first explosion-proof grid 13 is greater than or equal to a length of the explosion-proof valve 44 of the upper cover 40, to ensure that the second explosion-proof grid 23, the third explosion-proof grid 24, and the first explosion-proof grid 13 can cooperate to cover the explosion-proof valve 44, which can maximize a space for air gathering below the explosion-proof valve 44.

A tab or a blue film is prone to break to generate fragments during transportation of the energy-storage apparatus 1000. The first explosion-proof grid 13, the second explosion-proof grid 23, and the third explosion-proof grid 24 are disposed in the first through recess 113, the second through recess 213, and the third through recess 214 respectively, so that flowing of fragments of the tab or the blue film to a position under the explosion-proof valve 44, which may block a gas channel and consequently cause an explosion-proof failure, can be prevented. In addition, the tap can be prevented from directly contacting the explosion-proof valve 44.

Referring to FIG. 9 again, a thickness of the second lower plastic member 20 at a position where the third through recess 214 is defined is greater than a thickness of the second lower plastic member 20 at other positions. Specifically, a protrusion 28 is disposed on the second bottom surface 212 of the second-lower-plastic-member body 21. In the thickness direction (i.e., Z-axis direction) of the second lower plastic member 20, the third through recess 214 extends through the second top surface 211 and the protrusion 28. The third explosion-proof grid 24 is received in the third through recess 214.

It can be understood that the first lower plastic member 10 includes the first explosion-proof grid 13. The first explosion-proof grid 13 defines the first gaps extending through the first top surface 111 and the first bottom surface 112. The second lower plastic member 20 includes the second explosion-proof grid 23, the third explosion-proof grid 24 close to the second explosion-proof grid 23, and the protrusion 28 protruding from the second bottom surface 212. The second explosion-proof grid 23 defines the second gaps extending through the second top surface 211 and the second bottom surface 212. The third explosion-proof grid 24 defines the through sub-recess 215 extending through the second top surface 211 and the protrusion 28. The second gap has a width w2 ranging from 0.8 mm to 1.3 mm. It needs to be noted that the width w2 of the second gap may be 0.8 mm, 1.3 mm, or any value ranging from 0.8 mm to 1.3 mm, such as 0.9, 1.0, 1.1, 1.2, etc.

The end of each of the multiple first grids 132 of the first explosion-proof grid 13 fixed to the second side wall 1132 is inclined towards the first bottom surface 112. The end of each of the multiple second grids 232 of the second explosion-proof grid 23 fixed to the fourth side wall 2132 is inclined towards the second bottom surface 212. The third explosion-proof grid 24 extends through the second top surface 211 and the protrusion 28, and has a relatively large thickness. That is, the multiple first grids 132 are inclined towards the first bottom surface 112 in the length direction (i.e., X-axis direction) of the first lower plastic member 10, and the multiple second grids 232 are inclined towards the second bottom surface 212 in the length direction (i.e., X-axis direction) of the second lower plastic member 20. When the first lower plastic member 10 abuts against the second lower plastic member 20, an inclined end of each of the multiple first grids 132 and an inclined end of each of the multiple second grids 232 are all away from the third explosion-proof grid 24. Therefore, the first explosion-proof grid 13, the second explosion-proof grid 23, and the third explosion-proof grid 24 form, as a whole, an arched explosion-proof grid A away from the explosion-proof valve 44 of the upper cover 40 and protruding downwards (away from the upper cover 40). The explosion-proof valve 44 faces the arched explosion-proof grid A in the thickness direction of the upper cover 40 and the arched explosion-proof grid A is located below the explosion-proof valve 44. Therefore, a space directly below the explosion-proof valve 44 can be enlarged, facilitating gas gathering, and additionally, an accommodation space for the tab is enlarged, so that the fracture of the tab can be avoided. The arched explosion-proof grid A as a whole can also prevent the tab from blocking the through recess from three directions, and the three directions are perpendicular to the first explosion-proof grid 13, the second explosion-proof grid 23, and the third explosion-proof grid 24 respectively. In addition, the arched explosion-proof grid A can prevent the tab from reaching below the upper cover 40 and establishing abnormal electrical connection with the upper cover 40, thereby improving safety of the energy-storage apparatus 1000.

Figure 10:
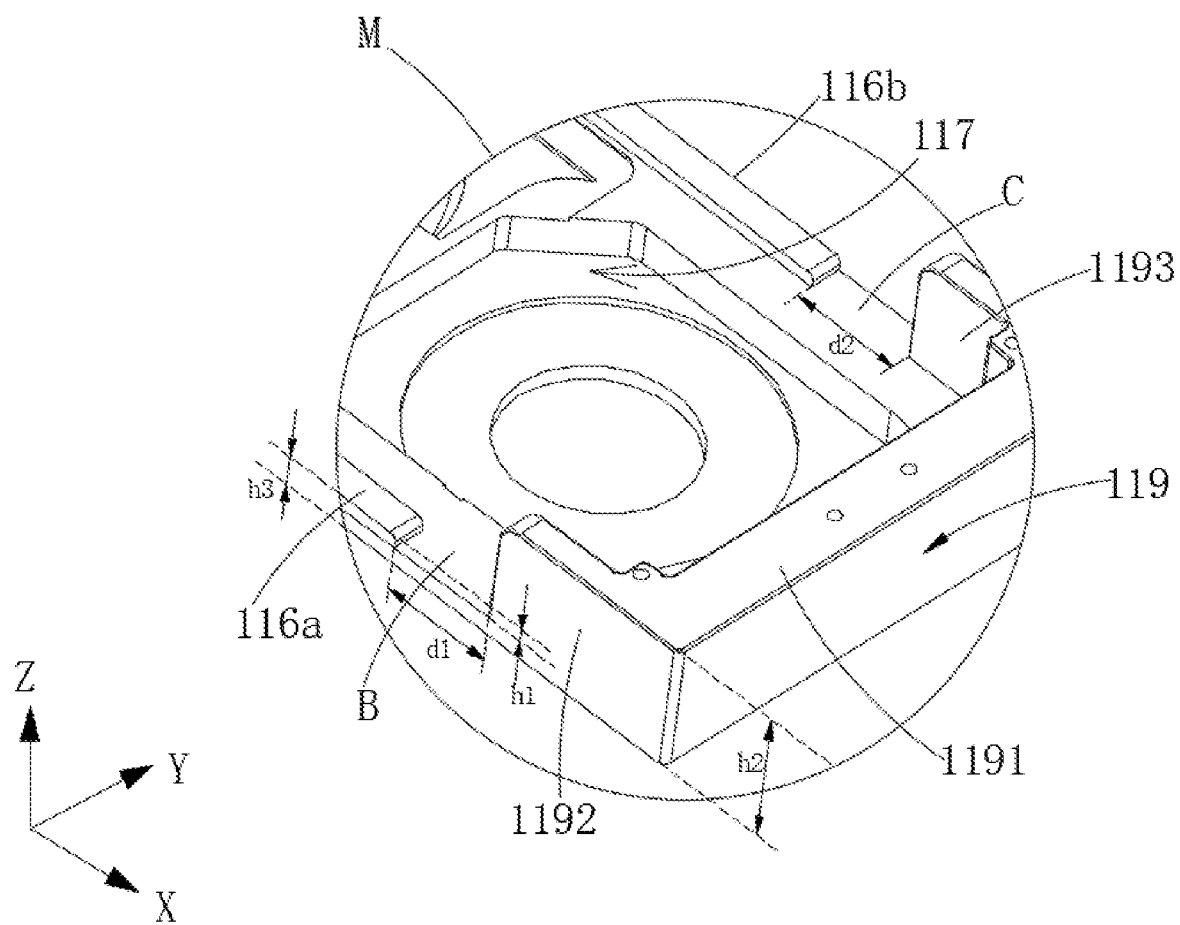
FIG. 10 is a schematic structural view of the first lower plastic member at circle M in FIG. 6, where a first deformation portion in a first implementation is illustrated.

Referring to FIG. 6 and FIG. 10, the first lower plastic member 10 further includes a first boss 118, a first part 119, a second part 116, and a first deformation portion. The first deformation portion is connected between the first part 119 and the second part 116. A depth h1 of the first deformation portion is less than both a height h2 of the first part 119 and a height h3 of the second part 116 in a thickness direction (i.e., Z-axis direction) of the first-lower-plastic-member body 11. In the implementations, the first part 119 protrudes from one end of the first bottom surface 112 and includes a first block 1191, a first side block 1192, and a second side block 1193. The second part 116 includes a first reinforcing rib 116a and a second reinforcing rib 116b that protrude from two opposite sides of the first bottom surface 112 respectively. The first deformation portion defines a first notch B and a second notch C. The first notch B is part of the first deformation portion between the first reinforcing rib 116a and the first side block 1192. The second notch C is part of the first deformation portion between the second reinforcing rib 116b and the second side block 1193.

Specifically, a ratio of the depth h1 of the first deformation portion to the height h2 of the first part 119 ranges from 0.05 to 0.42. A ratio of the depth h1 of the first deformation to the height h3 of the second part 116 ranges from 0.16 to 0.6. In a thickness direction of the first-lower-plastic-member body 11, the depth h1 of the first deformation portion is 0.6±0.1 mm, the height h2 of the first part 119 is 6.0±0.5 mm, and the height h3 of the second part 116 is 1.4±0.5 mm. The depth h1 of the first deformation portion is a distance between a surface of the second part 116 away from the first top surface 111 and the first bottom surface 112 of the first-lower-plastic-member body 11. The height h2 of the first part 119 is a distance between the first top surface 111 of the first-lower-plastic-member body 11 and a surface of the first part 119 away from the first top surface 111 in the thickness direction of the first lower plastic member 10. The height h3 of the second part 116 is a distance between the first top surface 111 of the first-lower-plastic-member body 11 and the surface of the second part 116 away from the first top surface 111 in the thickness direction of the first lower plastic member 10. It needs to be noted that the ratio of the depth h1 of the first deformation portion to the height h2 of the first part 119 may be 0.05, 0.42, or any value ranging from 0.05 to 0.42, such as 0.08, 0.10, 0.15, 0.23, 0.25, 0.35, 0.40, etc. The ratio of the depth h1 of the first deformation to the height h3 of the second part 116 may be 0.16, 0.6, or any other value ranging from 0.16 to 0.6, such as 0.18, 0.20, 0.25, 0.30, 0.35, 0.40, 0.50, 0.55, etc. Specifically, in the length direction (i.e., X-axis direction) of the first lower plastic member 10, the first boss 118, the second part 116, the first deformation portion, and the first part 119 protrude from and sequentially arranged on the first bottom surface 112 of the first-lower-plastic-member body 11. The first boss 118 and the first part 119 are disposed at two opposite ends of the first lower plastic member 10 in the length direction (i.e., X-axis direction) of the first lower plastic member 10 respectively. The first boss 118 and the first part 119 extend along edges of two ends of the first-lower-plastic-member body 11 respectively. The second part 116 includes a first reinforcing rib 116a and a second reinforcing rib 116b that are respectively disposed at two opposite sides of the first bottom surface 112.

The first boss 118 includes a baffle 1181, a first side plate 1182, and a second side plate 1183. The baffle 1181 extends from the second side wall 1132 of the first through recess 113 in a direction away from the first side wall 1131, i.e., the baffle 1181 protrudes from one end of the second side wall 1132. It can be understood that the second side wall 1132 of the first through recess 113 and the baffle 1181 are integrally formed. The first side plate 1182 and the second side plate 1183 are connected to two opposite sides of a surface of the baffle 1181 facing the first part 119 respectively. The first side plate 1182 and the second side plate 1183 are spaced apart from each other in a width direction (i.e., Y-axis direction) of the first lower plastic member 10. The first side plate 1182 and the second side plate 1183 each extend in the length direction (i.e., X-axis direction) of the first lower plastic member 10. In the implementations, the baffle 1181, the first side plate 1182, and the second side plate 1183 are integrally formed. In other implementations, the baffle 1181, the first side plate 1182, and the second side plate 1183 may also be separately formed.

The first reinforcing rib 116a and the second reinforcing rib 116b are elongated, protrude from two opposite sides of the first bottom surface 112 in a width direction (i.e., Y-axis direction) of the first bottom surface 112 respectively, and extend in the length direction (i.e., X-axis direction) of the first lower plastic member 10. One end of the first reinforcing rib 116a is connected to one end of the first side plate 1182, and one end of the second reinforcing rib 116b is connected to one end of the second side plate 1183. Both the other end of the first reinforcing rib 116a and the other end of the second reinforcing rib 116b are close to the first recess 117. In the implementations, the first reinforcing rib 116a and the first boss 118 are integrally formed, and the second reinforcing rib 116b and the first boss 118 are integrally formed. In other implementations, the first reinforcing rib 116a and the first boss 118 may be separately formed, and the second reinforcing rib 116b and the first boss 118 may be separately formed, or the first boss 118 may be absent. The first reinforcing rib 116a and the second reinforcing rib 116b may increase the strength of the first-lower-plastic-member body 11. Other reinforcing ribs may also be provided to be connected between the first reinforcing rib 116a and the second reinforcing rib 116b, thereby improving the strength of the first-lower-plastic-member body 11.

The first part 119 includes a first block 1191, a first side block 1192, and a second side block 1193. The first block 1191 is rectangular and disposed at one end of the first-lower-plastic-member body 11. The first side block 1192 and the second side block 1193 are disposed at two opposite ends of the first block 1191 in the width direction (i.e., Y-axis direction) of the first lower plastic member 10 respectively. The first side block 1192 and the second side block 1193 extend in the length direction (i.e., X-axis direction) of the first lower plastic member 10. Both one end of the first side block 1192 and one end of the second side block 1193 are fixed to the first block 1191, and both the other end of the first side block 1192 and the other end of the second side block 1193 are close to the first recess 117. In the width direction (i.e., Y-axis direction) of the first lower plastic member 10, the first side block 1192 and the first reinforcing rib 116*a* are located at the same side of the first lower plastic member 10, and the second side block 1193 and the second reinforcing rib 116*b* are located at the opposite side of the first lower plastic member 10.

The first deformation portion defines a first notch B and a second notch C. In the length direction (i.e., X-axis direction) of the first lower plastic member 10, the first notch B is part of the first deformation portion between the first reinforcing rib 116*a* and the first side block 1192, and the second notch C is part of the first deformation portion between the second reinforcing rib 116*b* and the second side block 1193. In the width direction (i.e., Y-axis direction) of the first lower plastic member 10, the first notch B and the second notch C are symmetrically arranged at two opposite sides of the first recess 117 respectively. The first notch B and the second notch C extend in the length direction (i.e., X-axis direction) of the first lower plastic member 10. In the implementations, each of a length d1 of the first notch B and a length d2 of the second notch C is 6.0±0.5 mm. Both the first notch B and the second notch C are rectangular, and in other implementations, both the first notch B and the second notch C may be in other shapes such as trapezoid.

Figure 11:
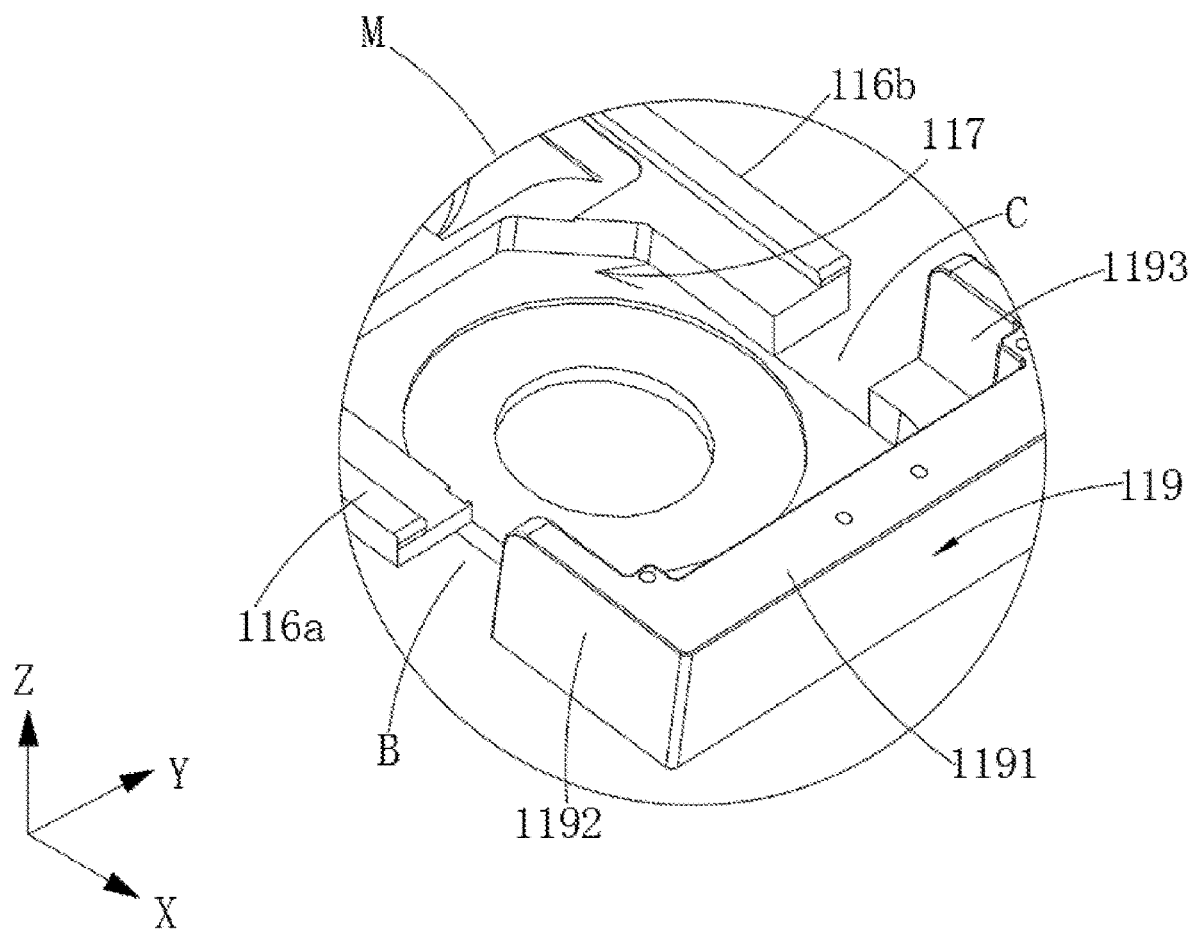
FIG. 11 illustrates a first deformation portion of the first lower plastic member in FIG. 6 in a second implementation.

Refer to FIG. 11, where FIG. 11 illustrates a first deformation portion in a second implementation of the disclosure. The first deformation portion defines a first sub-notch and a second sub-notch. The first sub-notch is in communication with the first notch B, and the second sub-notch is in communication with the second notch C. Specifically, the first-lower-plastic-member body 11 further defines a first sub-notch. The first sub-notch extends through the first top surface 111 and the first bottom surface 112 and is in communication with the first notch B. The first sub-notch extends away from the first notch B in the width direction of the first-lower-plastic-member body 11. In the thickness direction of the first-lower-plastic-member body 11, a projection of the first notch B falls within a projection of the first sub-notch.

The second sub-notch extends through the first top surface 111 and the first bottom surface 112 and is in communication with the second notch C. The second sub-notch extends away from the second notch C in the width direction of the first-lower-plastic-member body 11. In the thickness direction of the first-lower-plastic-member body 11, a projection of the second notch C falls within a projection of the second sub-notch. The first deformation portion is increased in size, thereby further improving flexibility of the first lower plastic member 10 at a position close to one end of the first lower plastic member 10.

In other implementations, the first notch B and the second notch C may be defined at positions other than the two opposite sides of the first recess 117 as long as stress concentration of the first lower plastic member 10 can be relieved.

Figure 12:
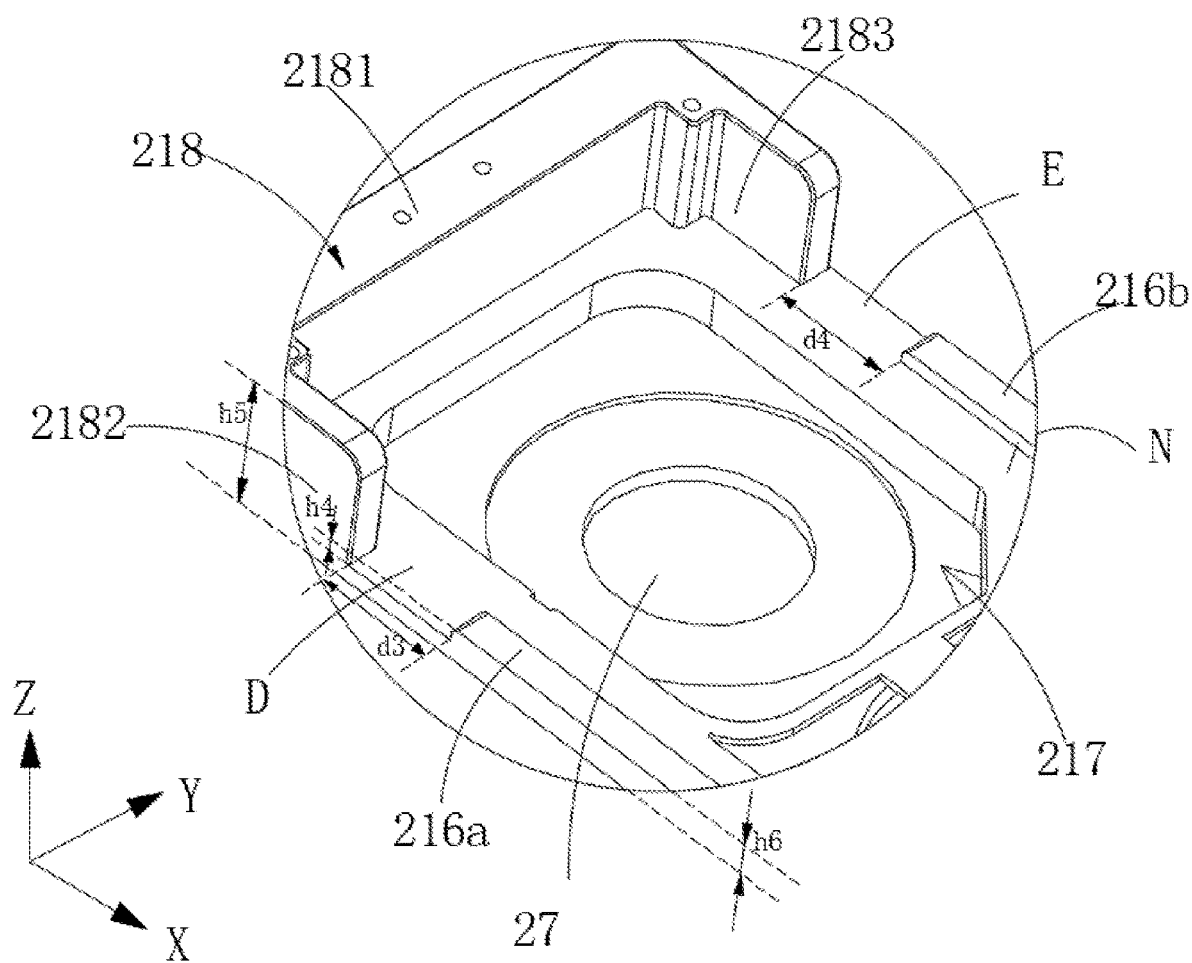
FIG. 12 is a schematic structural view of the second lower plastic member at circle N in FIG. 8.

Referring to FIG. 8 and FIG. 12, the second lower plastic member 20 further includes a third part 218, a fourth part 216, and a second deformation portion. The second deformation portion is connected between the third part 218 and the fourth part 216. In a thickness direction (i.e., Z-axis direction) of the second-lower-plastic-member body 21, a depth h4 of the second deformation portion is less than both a height h5 of the third part 218 and a height h6 of the fourth part 216.

In the implementations, the third part 218 protrudes from one end of the second bottom surface (212) and includes a second block 2181, a third side block 2182, and a fourth side block 2183. The fourth part 116 includes a third reinforcing rib 216*a* and a fourth reinforcing rib 216*b* that protrude from two opposite sides of the second bottom surface 212 respectively. The second deformation portion defines a third notch D and a fourth notch E. The third notch D is part of the second deformation portion between the third reinforcing rib 216*a* and the third side block 2182. The fourth notch E is part of the second deformed portion between the fourth reinforcing rib 216*b* and the fourth side block 2183. The third notch D and the fourth notch E are rectangular, and in other implementations, the third notch D and the fourth notch E may be in other shapes such as trapezoid.

Specifically, in the length direction (i.e., X-axis direction) of the second lower plastic member 20, the third part 218, the second deformation portion, and the fourth part 216 protrude from and sequentially arranged on the second bottom surface 212 of the second-lower-plastic-member body 21. The third part 218 is disposed at one end of the second lower plastic member 20 away from the protrusion 28, and extends along an edge of the second-lower-plastic-member body 21. The third reinforcing rib 216*a* and the fourth reinforcing rib 216*b* are disposed between the third part 218 and the protrusion 28, and respectively disposed at two opposite sides of the second bottom surface 212.

The third reinforcing rib 216*a* and the fourth reinforcing rib 216*b* are elongated, protrude from two opposite sides of the second bottom surface 212 in a width direction (i.e., Y-axis direction) of the second bottom surface 212 respectively, and extend in the length direction (i.e., X-axis direction) of the second lower plastic member 20. One end of the third reinforcing rib 216*a* and one end of the fourth reinforcing rib 216*b* are connected to two opposite ends of the protrusion 28 in the width direction (i.e., Y-axis direction) of the second lower plastic member 20 respectively. Both the other end of the third reinforcing rib 216*a* and the other end of the fourth reinforcing rib 216*b* are close to the second recess 217. In the implementations, the third reinforcing rib 216*a* and the protrusion 28 are integrally formed, and the fourth reinforcing rib 216*b* and the protrusion 28 are integrally formed. In other implementations, the third reinforcing rib 216*a* and the protrusion 28 may be separately formed, and the fourth reinforcing rib 216*b* and the protrusion 28 may be separately formed. The third reinforcing rib 216*a* and the fourth reinforcing rib 216*b* may increase the strength of the second-lower-plastic-member body 21. Other reinforcing ribs may also be provided to be connected between the third reinforcing rib 216*a* and the fourth reinforcing rib 216*b*, thereby improving the overall strength of the second-lower-plastic-member body 21.

The third part 218 includes a second block 2181, a third side block 2182, and a fourth side block 2183. The second block 2181 is rectangular and disposed at one end of the second-lower-plastic-member body 21. The third side block 2182 and the fourth side block 2183 are disposed at two opposite ends of the second block 2181 in the width direction (i.e., Y-axis direction) of the second lower plastic member 20 respectively. The third side block 2182 and the fourth side block 2183 extend in the length direction (i.e., X-axis direction) of the second lower plastic member 20. Both one end of the third side block 2182 and one end of the fourth side block 2183 are fixed to the second block 2181, and both the other end of the third side block 2182 and the other end of the fourth side block 2183 are close to the second recess 217. In the width direction (i.e., Y-axis direction) of the second lower plastic member 20, the third side block 2182 and the third reinforcing rib 216a are located at the same side of the second lower plastic member 20, and the fourth side block 2183 and the fourth reinforcing rib 216b are located at the opposite side of the second lower plastic member 20.

The second deformation portion defines a third notch D and a fourth notch E. In the length direction (i.e., X-axis direction) of the second lower plastic member 20, the third notch D is part of the second deformation portion between the third reinforcing rib 216a and the third side block 2182, and the fourth notch E is part of the second deformation portion between the fourth reinforcing rib 216b and the fourth side block 2183. The third notch D and the fourth notch E are symmetrically arranged at two opposite sides of the second recess 217 in the width direction (i.e., Y-axis direction) of the second lower plastic member 20 respectively. The third notch D and the fourth notch E extend in the length direction (i.e., X-axis direction) of the second lower plastic member 20. In the implementations, each of a length d3 of the third notch D and a length d4 of the fourth notch E is $6.0 \pm 0.5$ mm.

In other implementations, the third notch D and the fourth notch E may be defined at positions other than the two opposite sides of the second recess 217 as long as stress concentration of the second lower plastic member 20 can be relieved.

In other implementations, the second deformation portion further defines a third sub-notch. The third sub-notch extends through the second top surface 211 and the second bottom surface 212 and is in communication with the third notch D. The third sub-notch extends away from the third notch D in the width direction of the second-lower-plastic-member body 21. In the thickness direction of the second-lower-plastic-member body 21, a projection of the third notch D falls within a projection of the third sub-notch.

The second deformation portion further defines a fourth sub-notch. The fourth sub-notch extends through the second top surface 211 and the second bottom surface 212 and is in communication with the fourth notch E. The fourth sub-notch extends away from the fourth notch E in the width direction of the second-lower-plastic-member body 21. In the thickness direction of the second-lower-plastic-member body 21, a projection of the fourth notch E falls within a projection of the fourth sub-notch.

Figure 13:
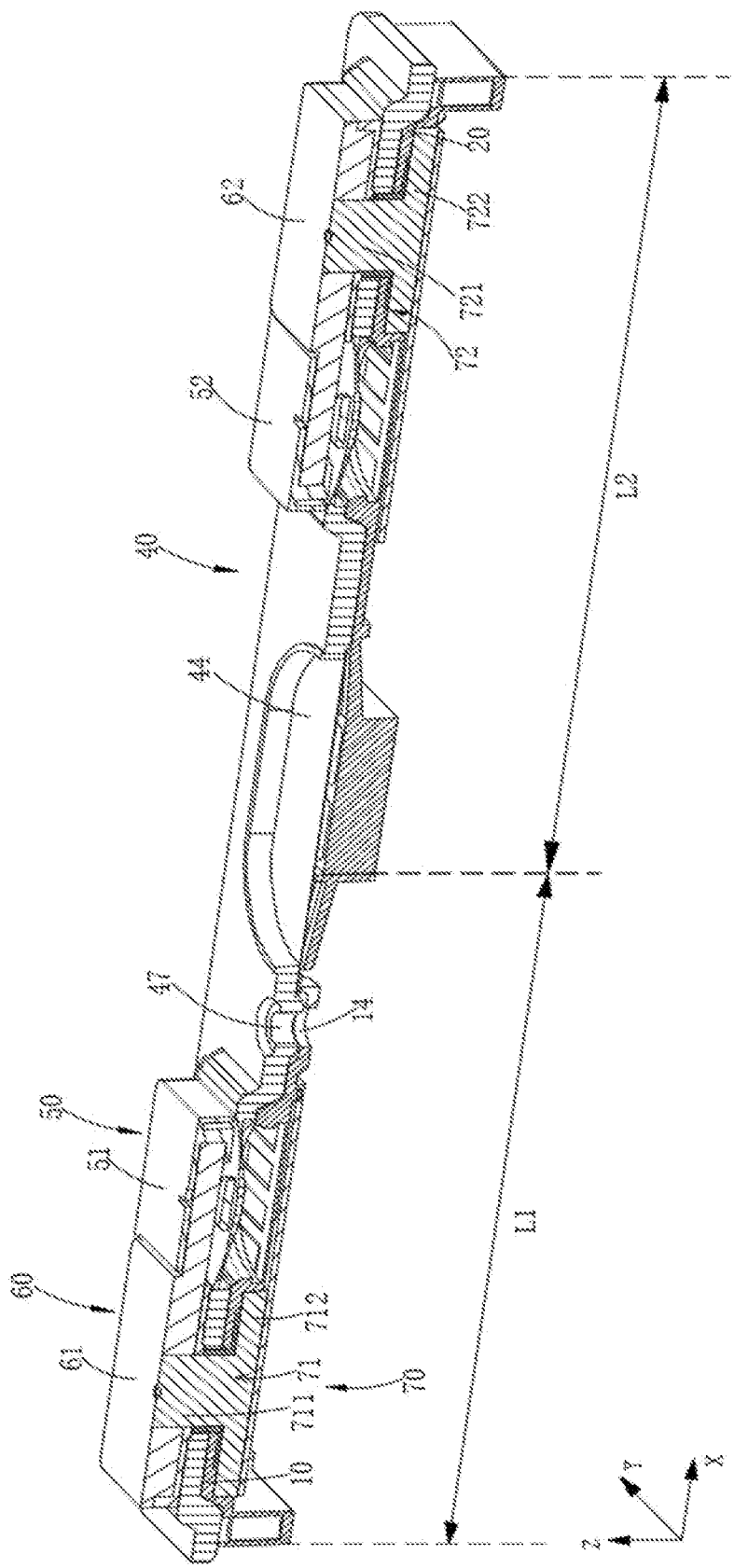
FIG. 13 is a schematic structural view of assembly of the end cover assembly in FIG. 2.

Referring to FIG. 13, the end cover assembly 100 further includes an upper plastic assembly 50, a pressing block assembly 60, and an electrode post 70. Specifically, the upper plastic assembly 50 and the upper cover 40 are stacked, and the upper plastic assembly 50 is located at one side of the upper cover 40 away from the lower plastic assembly 30. The electrode post 70 includes a positive terminal post 71 and a negative terminal post 72. The upper plastic assembly 50 includes a first upper plastic member 51 and a second upper plastic member 52. The first upper plastic member 51 and the second upper plastic member 52 are arranged side by side at two ends of the upper cover 40 in a length direction (i.e., X-axis direction) of the end cover assembly 100 respectively. The first upper plastic member 51 defines a through hole (not illustrated) through which the positive terminal post 71 extends, and the second upper plastic member 52 defines a through hole (not illustrated) through which the negative terminal post 72 extends. The pressing block assembly 60 includes a first pressing block 61 and a second pressing block 62. Each of the first pressing block 61 and the second pressing block 62 is stacked on one side of the upper plastic assembly 50 away from the upper cover 40. The first pressing block 61 is fixedly connected to the first upper plastic member 51, and the second pressing block 62 is fixedly connected to the second upper plastic member 52.

The first lower plastic member 10 and the second lower plastic member 20 are mounted to a bottom surface of the upper cover 40, and a dimension L2 of the second lower plastic member 20 is greater than a dimension L1 of the first lower plastic member 10 in a length direction (i.e., X-axis direction) of the upper cover 40. Specifically, as illustrated in FIG. 13, a ratio L2/L1 of the length L2 of the second lower plastic member 20 to the length L1 of the first lower plastic member 10 ranges from 1.1 to 1.4. Specifically, the ratio L2/L1 of the length L2 of the second lower plastic member 20 to the length L1 of the first lower plastic member 10 may be 1.1, 1.4, or any value ranging from 1.1 to 1.4, for example, 1.15, 1.18, 1.23, 1.26, 1.36, etc. In the thickness direction (i.e., Z-axis direction) of the end cover assembly 100, the positive terminal post 71 sequentially extends through the first terminal-post through-hole 17 of the first lower plastic member 10, the positive-post through-hole 42, and the through hole of the first upper plastic member 51, and is fixedly connected to the first pressing block 61. The negative terminal post 72 sequentially extends through the second terminal-post through-hole 27 of the second lower plastic member 20, the negative terminal-post through-hole 43, and the through hole of the second upper plastic member 52, and is fixedly connected to the second pressing block 62. The first lower plastic member 10 and the second lower plastic member 20 are clamped by the electrode post 70 and the upper cover 40. Specifically, the positive terminal post 71 includes a first cylinder 711 and a first flange portion 712, and the negative terminal post 72 includes a second cylinder 721 and a second flange portion 722. The first flange portion 712 of the positive terminal post 71 is crimped to a bottom surface of the first lower plastic member 10, and the second flange portion 722 of the negative terminal post 72 is crimped to a bottom surface of the second lower plastic member 20. When the positive terminal post 71 is welded to the first pressing block 61, and the negative terminal post 72 is welded to the second pressing block 62, the first lower plastic member 10 and the second lower plastic member 20 may be excessively pressed to slightly warp, and especially if a large amount of heat is generated during welding, the first lower plastic member 10 and the second lower plastic member 20 are more prone to deformation after being heated. The first notch B and the second notch C are defined at the sides of the first lower plastic member 10 respectively, and the third notch D and the fourth notch E are defined at the sides of the second lower plastic member 20 respectively, so that structural hardness of the first lower plastic member 10 and structural hardness of the second lower plastic member 20 can be reduced. The first lower plastic member 10 and the second lower plastic member 20 can return to flat by bending the first lower plastic member 10 and the second lower plastic member 20 at positions corresponding to the notches. Moreover, during crimping and welding, due to the pressure in the thickness direction (i.e., Z-axis direction) of the end cover assembly 100, the first notch B, the second notch C, the third notch D, and the fourth notch E are used for stress release of the first lower plastic member 10 and the second lower plastic member 20, thereby avoiding warping during crimping and welding.

It can be understood that, in other implementations, the first lower plastic member 10 defines the first notch B and the second notch C, while the second lower plastic member 20 does not define the third notch D and the fourth notch E. Alternatively, the second lower plastic member 20 defines the third notch D and the fourth notch E, while the first lower plastic member 10 does not define the first notch B and the second notch C.

The above implementations of the disclosure are described in detail. Principles and implementations of the disclosure are elaborated with specific examples herein. The illustration of implementations above is only used to help understanding of methods and core ideas of the disclosure. Additionally, for those skilled people in the art, according to ideas of the disclosure, there may be modifications in specific implementations and application scope. In conclusion, the content of this specification should not be construed as limiting the disclosure.

What is claimed is:

1. A lower plastic assembly, applicable to an energy-storage apparatus and comprising a first lower plastic member, wherein the first lower plastic member comprises a first-lower-plastic-member body, wherein the first-lower-plastic-member body has a first top surface and a first bottom surface opposite the first top surface, and further has a first part and a second part, wherein
    the first part and the second part cooperatively define a first deformation portion in a length direction of the first-lower-plastic-member body, a ratio of a depth h1 of the first deformation portion to a height h2 of the first part ranges from 0.05 to 0.42 in a thickness direction of the first-lower-plastic-member body, and a ratio of the depth h1 of the first deformation portion to a height h3 of the second part ranges from 0.16 to 0.6; and
    the first deformation portion has a first notch and a first sub-notch, wherein the first sub-notch extends through the first top surface and the first bottom surface and is in communication with the first notch, the first sub-notch extends away from the first notch in a width direction of the first-lower-plastic-member body, and an orthogonal projection of the first notch on the first top surface falls within an orthogonal projection of the first sub-notch on the first top surface.

2. The lower plastic assembly of claim 1, wherein the first part protrudes from one end of the first bottom surface and comprises a first block, a first side block, and a second side block, the second part comprises a first reinforcing rib and a second reinforcing rib that protrude from two opposite sides of the first bottom surface respectively, and the first deformation portion further has a second notch, wherein the first reinforcing rib and the first side block cooperatively define the first notch, and the second reinforcing rib and the second side block cooperatively define the second notch.

3. The lower plastic assembly of claim 1, wherein the lower plastic assembly further comprises a second lower plastic member, wherein the second lower plastic member comprises a second-lower-plastic-member body, wherein the second-lower-plastic-member body has a second top surface and a second bottom surface opposite the second top surface;
    the second-lower-plastic-member body comprises a third part, and a fourth part, wherein
    the third part and the fourth part cooperatively define a second deformation portion in a length direction of the second-lower-plastic-member body, and a depth h4 of the second deformation portion is less than both a height h5 of the third part and a height h6 of the fourth part in a thickness direction of the second-lower-plastic-member body.

4. The lower plastic assembly of claim 3, wherein the third part protrudes from one end of the second bottom surface and comprises a second block, a third side block, and a fourth side block, the fourth part comprises a third reinforcing rib and a fourth reinforcing rib that protrude from two opposite sides of the second bottom surface respectively, and the second deformation portion further has a third notch and a fourth notch, wherein the third reinforcing rib and the third side block cooperatively define the third notch, and the fourth reinforcing rib and the fourth side block cooperatively define the fourth notch.

5. The lower plastic assembly of claim 3, wherein the first lower plastic member and the second lower plastic member are integrally formed, the first deformation portion is disposed at one end of the first lower plastic member away from the second lower plastic member, and the second deformation portion is disposed at one end of the second lower plastic member away from the first lower plastic member.

6. The lower plastic assembly of claim 2, wherein the first lower plastic member comprises a first explosion-proof grid located at one end of the first lower plastic member away from the first part, wherein the first explosion-proof grid defines a plurality of first gaps extending through the first top surface and the first bottom surface.

7. The lower plastic assembly of claim 6, wherein the first explosion-proof grid comprises a plurality of first grids, wherein each two adjacent first grids define one of the plurality of first gaps;
    for each of the plurality of first grids, a bottom surface of the first grid is a first inclined surface, wherein the first inclined surface has a first boundary line and a second boundary line in a length direction of the first grid, wherein the second boundary line is closer to the first notch and the second notch than the first boundary line, and the first inclined surface is inclined and extends from the second boundary line to the first boundary line in a first direction, wherein the first direction is a direction in which the first grid protrudes from the first bottom surface.

8. The lower plastic assembly of claim 7, wherein the first lower plastic member defines a first through recess, wherein the first through recess has a first side wall and a second side wall opposite the first side wall, the plurality of first grids are received in the first through recess, one end of each of the plurality of first grids is fixed to the first side wall, and the other end of each of the plurality of first grids is fixed to the second side wall and is inclined towards the first bottom surface.

9. The lower plastic assembly of claim 6, wherein the first lower plastic member further comprises a first gas hole and a first protective grid, wherein the first gas hole extends through the first top surface and the first bottom surface, the first protective grid is disposed on the first bottom surface in a thickness direction of the first lower plastic member and covers the first gas hole, and the first protective grid defines an exhaust region in communication with the first gas hole.

10. The lower plastic assembly of claim 6, wherein the lower plastic assembly further comprises a second lower plastic member, wherein the second lower plastic member comprises a second-lower-plastic-member body, a second explosion-proof grid, and a third explosion-proof grid, wherein the third explosion-proof grid is located at one end of the second lower plastic member, the second explosion-proof grid is adjacent to the third explosion-proof grid and defines a plurality of second gaps extending through the second-lower-plastic-member body, and the third explosion-proof grid defines a plurality of through sub-recesses extending through the second-lower-plastic-member body.

11. The lower plastic assembly of claim 10, wherein the second-lower-plastic-member body has a second top surface and a second bottom surface, wherein a protrusion is disposed at one end of the second bottom surface, the third explosion-proof grid extends through the protrusion and the second top surface, and the second explosion-proof grid extends through the second top surface and the second bottom surface.

12. The lower plastic assembly of claim 11, wherein the second explosion-proof grid comprises a plurality of second grids, wherein each two adjacent second grids define one of the plurality of second gaps; for each of the plurality of second grids, a bottom surface of the second grid is a second inclined surface, wherein the second inclined surface has a third boundary line and a fourth boundary line in a length direction of the second grid, and the second inclined surface is inclined and extends from the fourth boundary line to the third boundary line in a second direction, wherein the second direction is a direction in which the second grid protrudes from the second bottom surface.

13. The lower plastic assembly of claim 10, wherein an explosion-proof valve is disposed on the energy-storage apparatus; when the lower plastic assembly is mounted to the energy-storage apparatus, the first explosion-proof grid of the first lower plastic member faces the explosion-proof valve, and the second explosion-proof grid and the third explosion-proof grid of the second lower plastic member face the explosion-proof valve; and the second explosion-proof grid, the third explosion-proof grid, and the first explosion-proof grid are arranged in sequence and cooperate to form an arched explosion-proof grid protruding away from the explosion-proof valve, wherein the explosion-proof valve faces the arched explosion-proof grid in a thickness direction of the first lower plastic member and the arched explosion-proof grid is located below the explosion-proof valve.

14. An end cover assembly, comprising an upper cover and a lower plastic assembly, wherein
the lower plastic assembly is applicable to an energy-storage apparatus and comprises a first lower plastic member, wherein the first lower plastic member comprises a first-lower-plastic-member body, wherein the first-lower-plastic-member body has a first top surface and a first bottom surface opposite the first top surface, and further comprises a first part, and a second part;
the first part and the second part cooperatively define a first deformation portion in a length direction of the first-lower-plastic-member body, a ratio of a depth h1 of the first deformation portion to a height h2 of the first part ranges from 0.05 to 0.42 in a thickness direction of the first-lower-plastic-member body, and a ratio of the depth h1 of the first deformation portion to a height h3 of the second part ranges from 0.16 to 0.6; and
the first deformation portion has a first notch and a first sub-notch, wherein the first sub-notch extends through the first top surface and the first bottom surface and is in communication with the first notch, the first sub-notch extends away from the first notch in a width direction of the first-lower-plastic-member body, and an orthogonal projection of the first notch on the first top surface falls within an orthogonal projection of the first sub-notch on the first top surface; and
the lower plastic assembly comprises a second lower plastic member, wherein the first lower plastic member and the second lower plastic member are stacked to one side of the upper cover, one end of the first lower plastic member faces and abuts against one end of the second lower plastic member, the first lower plastic member and the second lower plastic member are arranged side by side in a length direction of the upper cover, and in the length direction of the upper cover, a dimension L2 of the second lower plastic member is greater than a dimension L1 of the first lower plastic member.

15. The end cover assembly of claim 14, wherein in the length direction of the upper cover, a ratio L2/L1 of the length L2 of the second lower plastic member to the length L1 of the first lower plastic member ranges from 1.1 to 1.4.

16. The end cover assembly of claim 14, wherein the upper cover comprises an explosion-proof valve, and the first lower plastic member comprises a first explosion-proof grid defining a plurality of first gaps that extend through the first top surface and the first bottom surface; the second lower plastic member comprises a second top surface, a second bottom surface, a second explosion-proof grid, a third explosion-proof grid adjacent to the second explosion-proof grid, and a protrusion protruding from the second bottom surface, wherein the second explosion-proof grid defines a plurality of second gaps extending through the second top surface and the second bottom surface, the third explosion-proof grid defines a through recess extending through the second top surface and the protrusion, and the second explosion-proof grid, the third explosion-proof grid, and the first explosion-proof grid are arranged in sequence and cooperate to form an arched explosion-proof grid protruding away from the explosion-proof valve, wherein the explosion-proof valve faces the arched explosion-proof grid in a thickness direction of the upper cover and the arched explosion-proof grid is located below the explosion-proof valve.

17. The end cover assembly of claim 16, wherein the first lower plastic member comprises the first explosion-proof grid, and the second lower plastic member comprises the second explosion-proof grid and the third explosion-proof grid adjacent to the second explosion-proof grid, wherein the second explosion-proof grid, the third explosion-proof grid, and the first explosion-proof grid are arranged in sequence in the length direction of the upper cover; and a sum of a length of the second explosion-proof grid, a length of the third explosion-proof grid, and a length of the first explosion-proof grid is greater than or equal to a length of the explosion-proof valve of the end cover assembly in the length direction of the upper cover.

18. An energy-storage apparatus, comprising a housing, an electrode assembly, and an end cover assembly, wherein the housing defines an opening and an accommodation cavity, the electrode assembly is accommodated in the accommodation cavity, and the end cover assembly covers the opening, wherein the end cover assembly comprises an upper cover and a lower plastic assembly, and wherein
the lower plastic assembly is applicable to an energy-storage apparatus and comprises a first lower plastic member, wherein the first lower plastic member comprises a first-lower-plastic-member body, wherein the first-lower-plastic-member body has a first top surface and a first bottom surface opposite the first top surface, and further comprises a first part, and a second part;

the first deformation portion is located between the first part and the second part in a length direction of the first lower plastic member body the first part and the second part cooperatively define a first deformation portion in a length direction of the first-lower-plastic-member body, a ratio of a depth h1 of the first deformation portion to a height h2 of the first part ranges from 0.05 to 0.42 in a thickness direction of the first-lower-plastic-member body, and a ratio of the depth h1 of the first deformation portion to a height h3 of the second part ranges from 0.16 to 0.6; and the first deformation portion has a first notch and a first sub-notch, wherein the first sub-notch extends through the first top surface and the first bottom surface and is in communication with the first notch, the first sub-notch extends away from the first notch in a width direction of the first-lower-plastic-member body, and an orthogonal projection of the first notch on the first top surface falls within an orthogonal projection of the first sub-notch on the first top surface; and the lower plastic assembly comprises a second lower plastic member, wherein the first lower plastic member and the second lower plastic member are stacked to one side of the upper cover, one end of the first lower plastic member faces and abuts against one end of the second lower plastic member, the first lower plastic member and the second lower plastic member are arranged side by side in a length direction of the upper cover, and in the length direction of the upper cover, a dimension L2 of the second lower plastic member is greater than a dimension L1 of the first lower plastic member.

\* \* \* \* \*

UNITED STATES PATENT AND TRADEMARK OFFICE
CERTIFICATE OF CORRECTION

| | | |
|---|---|---|
| PATENT NO. | : 12,009,550 B1 | |
| APPLICATION NO. | : 18/389031 | |
| DATED | : June 11, 2024 | |
| INVENTOR(S) | : Zhou et al. | |

It is certified that error appears in the above-identified patent and that said Letters Patent is hereby corrected as shown below:

In the Claims

In Column 24, Line 67, delete "and further comprises a first part, and a second part;" and insert -- and further comprises a first part and a second part; -- therefor.

In Column 25, Lines 1-3, please delete "the first deformation portion is located between the first part and the second part in a length direction of the first lower plastic member body the first part and the second" and insert -- the first part and the second -- therefor.

Signed and Sealed this
Tenth Day of September, 2024

Katherine Kelly Vidal
*Director of the United States Patent and Trademark Office*